United States Patent
Efrati

(10) Patent No.: US 9,318,940 B2
(45) Date of Patent: Apr. 19, 2016

(54) WEARABLE VIBRATION DEVICE

(76) Inventor: Mor Efrati, Givat-Yishayahu (IL)

( * ) Notice: Subject to any disclaimer, the term of this patent is extended or adjusted under 35 U.S.C. 154(b) by 408 days.

(21) Appl. No.: 13/819,086

(22) PCT Filed: Aug. 28, 2011

(86) PCT No.: PCT/IB2011/053765
§ 371 (c)(1),
(2), (4) Date: May 7, 2013

(87) PCT Pub. No.: WO2012/029009
PCT Pub. Date: Mar. 8, 2012

(65) Prior Publication Data
US 2013/0214913 A1 Aug. 22, 2013

Related U.S. Application Data

(60) Provisional application No. 61/378,983, filed on Sep. 1, 2010, provisional application No. 61/427,150, filed on Dec. 24, 2010, provisional application No. 61/452,649, filed on Mar. 15, 2011.

(51) Int. Cl.
| | |
|---|---|
| G08B 6/00 | (2006.01) |
| H02K 35/02 | (2006.01) |
| H04R 15/00 | (2006.01) |
| H04R 3/12 | (2006.01) |
| H04R 1/00 | (2006.01) |

(52) U.S. Cl.
CPC ............ *H02K 35/02* (2013.01); *G08B 6/00* (2013.01); *H04R 1/00* (2013.01); *H04R 3/12* (2013.01); *H04R 15/00* (2013.01); *H04R 2460/13* (2013.01)

(58) Field of Classification Search
None
See application file for complete search history.

(56) References Cited

U.S. PATENT DOCUMENTS

| | | | | |
|---|---|---|---|---|
| 5,198,624 | A * | 3/1993 | Paddock et al. | 181/166 |
| 5,817,000 | A * | 10/1998 | Souder | 600/15 |
| 6,970,275 | B2 * | 11/2005 | Cannon et al. | 359/213.1 |
| 6,982,696 | B1 * | 1/2006 | Shahoian | 345/156 |
| 7,023,112 | B2 | 4/2006 | Miyamoto | |
| 2004/0139975 | A1 * | 7/2004 | Nelson et al. | 128/848 |
| 2007/0038164 | A1 | 2/2007 | Afshar | |
| 2007/0085425 | A1 * | 4/2007 | Hirashima | 310/15 |
| 2007/0179414 | A1 | 8/2007 | Imboden | |
| 2007/0194635 | A1 | 8/2007 | Miura | |
| 2008/0129254 | A1 * | 6/2008 | Frayne | 322/3 |
| 2008/0143954 | A1 | 6/2008 | Abreu | |
| 2009/0007458 | A1 | 1/2009 | Seiler | |
| 2009/0105607 | A1 | 4/2009 | Shahrestani | |
| 2010/0036297 | A1 | 2/2010 | Kim | |
| 2011/0140458 | A1 * | 6/2011 | Arnold et al. | 290/1 R |

(Continued)

FOREIGN PATENT DOCUMENTS

JP 2003024871 1/2003

*Primary Examiner* — Fan Tsang
*Assistant Examiner* — Angelica M McKinney
(74) *Attorney, Agent, or Firm* — Robert G. Lev

(57) ABSTRACT

A device used for generating mechanical vibrations which includes at least one partially elastic closed shaped frame, a coil affixed to a first edge of the closed shaped frame, and an array fixed to a second edge of the closed shaped frame, where the array includes one or more magnets, and the closed shaped frame is configured to restrain the array and coil into an optimal relative position to limit movement of at least one of the coil and the array to a predefined path, where the movement is resultant upon an alternating current being applied to the coil so as to induce mechanical movement between the array and the coil.

18 Claims, 18 Drawing Sheets

(56) References Cited

U.S. PATENT DOCUMENTS

| | | |
|---|---|---|
| 2011/0169347 A1 | 7/2011 | Miyamoto |
| 2011/0190058 A1 | 8/2011 | Houston et al. |
| 2011/0204653 A1* | 8/2011 | Liu et al. .................. 290/1 R |
| 2012/0035513 A1 | 2/2012 | Afshar |
| 2012/0263338 A1* | 10/2012 | Hori et al. .................. 381/398 |

* cited by examiner

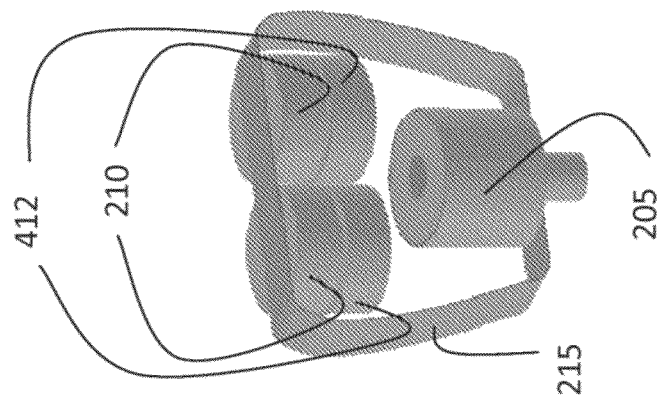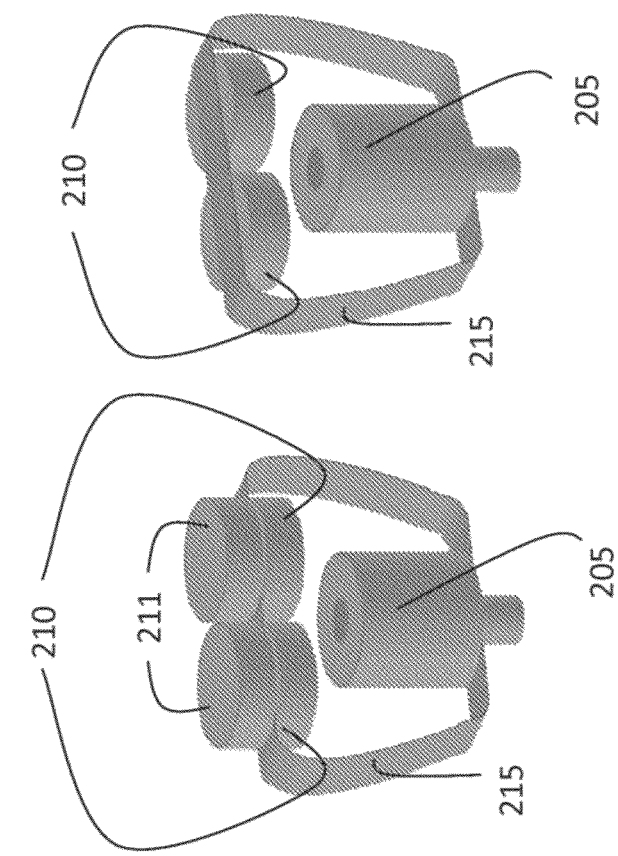

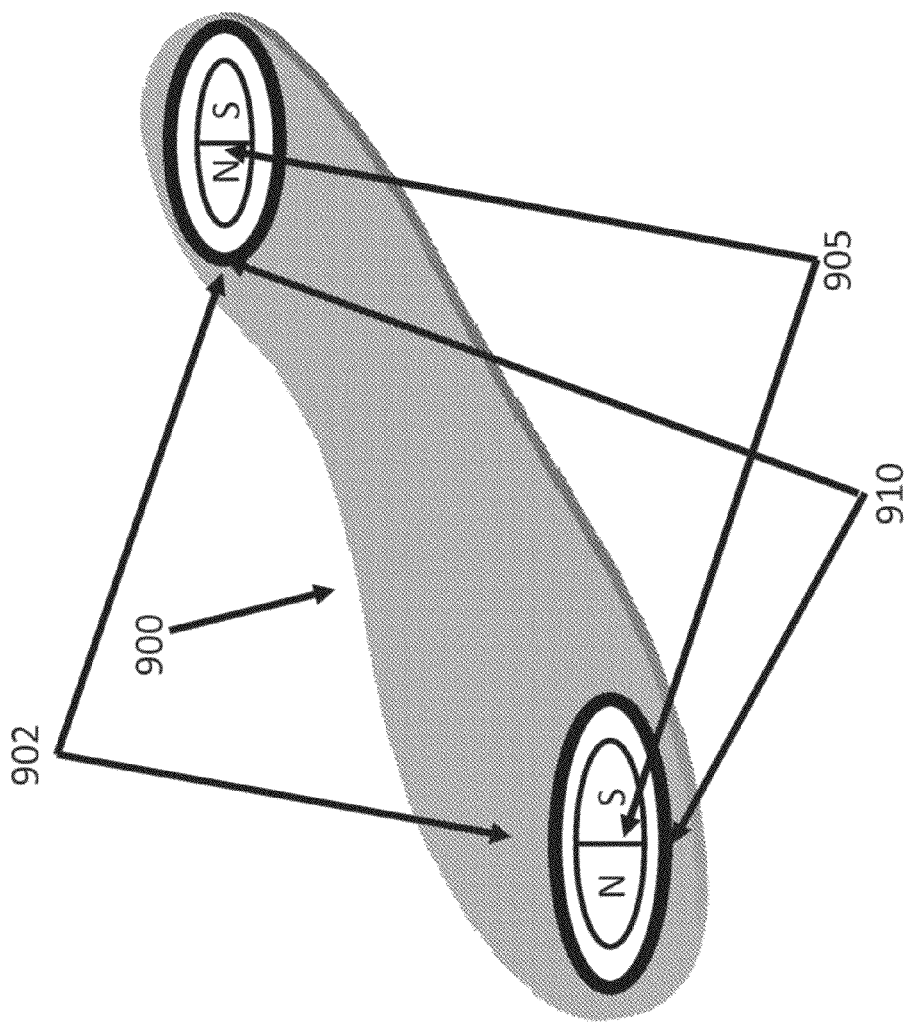

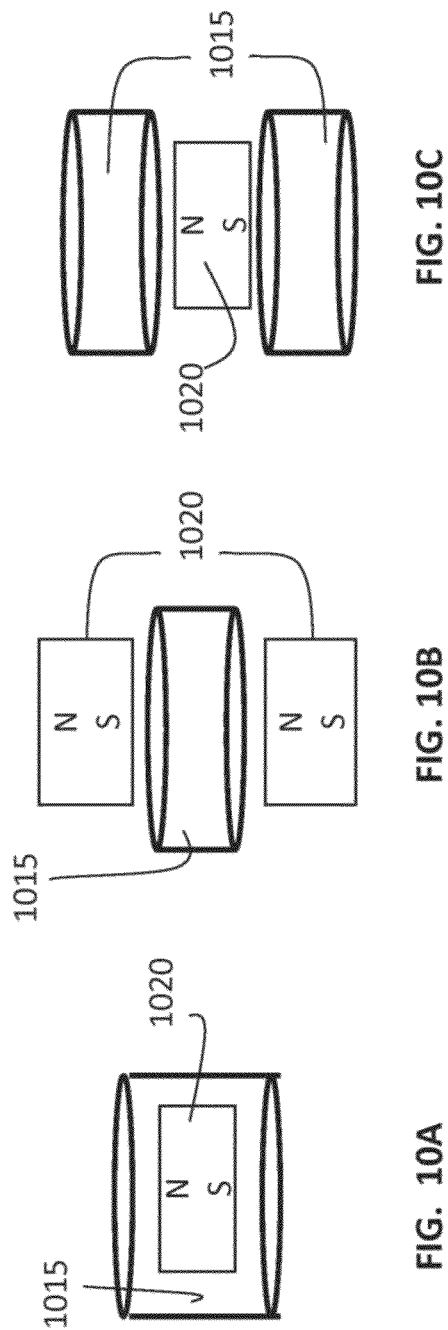

WEARABLE VIBRATION DEVICE

PRIORITY INFORMATION

This National Stage Application claims priority to U.S. Provisional Application No. 61/378,983 filed on Sep. 1, 2010, U.S. Provisional Application No. 61/427,150 filed on Dec. 24, 2010, U.S. Provisional Application No. 61/452,649 filed on Mar. 15, 2011, and PCT Application No: PCT/IB2011/053765 filed Aug. 28, 2011.

FIELD AND BACKGROUND OF THE INVENTION

The present invention relates to a wearable vibration device, and more particularly, but not exclusively to a wearable signal driven vibration device.

One field in which low frequency signals form a part of a user experience is personal media playing.

Among widely used personal media playing systems are MP3 players, portable DVD players, as well as smart cellular telephones (such as Apple™ iPhone or Samsung™ Galaxy S) that can store and reproduce recorded music or movies.

Current personal media playing systems provide stereo sound to users via conventional earphones and/or small speakers.

While the earphones and speakers may provide suitable sound, they do not provide a realistic sensory experience, as felt in a night club, or in a theater during a live performance by a big orchestra or a rock band.

The earphones and speakers fail to provide a realistic enough sensory experience, since the earphones and speakers are limited to sound felt by only one sensory channel, namely, the ears.

Personal media playing systems such as consumer electronic devices and computers require accurate reproduction of sound across a spectrum of audible frequencies, typically from about 20 Hz to about 20 KHz.

Typically, this frequency spectrum is divided up, into several bands or groups of frequencies with each band being handled by a specific device that is well suited to reproduce it accurately.

For example, the high frequency sound above 2,000 Hz may be given to a tweeter, while the frequencies from 200 Hz up to 2,000 Hz may be transmitted by a midrange speaker.

Traditionally, lower frequencies are taken over by sub-woofers.

Traditional subwoofers are bulky devices that contain relatively large and heavy cones, placed into relatively big acoustic cabinets that require a powerful amplifier to drive them adequately. This is because the declining sensitivity of the human ear in the low frequency range, the attenuating nature of air, and the very long wavelengths of the sound radiating at low frequencies, require the subwoofer to match the intensity of sound provided by other speakers in the rest of the audible spectrum.

However, traditional subwoofers are too bulky and cumbersome for personal and mobile media playing systems such as mobile MP3 players, portable DVD players, and smart cellular telephones.

Other fields in which low frequency signals play an important role, and in which subwoofers have been used, are simulation and virtual reality.

Some rarely used currently available alternatives to sub-woofers transmit low-frequency vibrations into various surfaces (say a surface of a cinema theater seat) so that the vibrations can be felt by people. The currently available alternatives have a bulky and cumbersome stationary design, and do not fit into a personal and mobile media playing system.

SUMMARY OF THE INVENTION

According to one aspect of the present invention there is provided a vibration device comprising: at least one partially elastic close shaped frame, a coil affixed to a first edge of the close shaped frame, and an array affixed to a second edge of the close shaped frame, the array comprising one or more magnets, the close shaped frame being configured to restrain the array and coil into an optimal relative position, to limit movement of at least one of the array and coil to a predefined path, the movement being resultant upon an alternating electric current being applied to the coil, and to transmit the movement between the array and coil.

According to a second aspect of the present invention, there is provided a vibration device comprising: a case, an elastic element connected to said case, a plurality of magnets forming a mass held together by virtue of attraction among said magnets, and connected to said elastic element, a plurality of coils, each of said coils being affixed to a side of said case, said elastic element being configured to restrain said mass into a position in which an axis of each of said coils is directed to a middle of a respective array comprising at least one of said magnets, to limit movement of said mass to a predefined path, the movement being resultant upon an alternating electric current being applied to at least one of said coils, and to transmit said movement between said mass and said case.

According to a third aspect of the present invention, there is provided a vibration device comprising: a case, an elastic element connected to the case, at least one frame housed in the case, connected to the elastic element, an array affixed to each respective one of a plurality of edges of the frame, the array comprising one or more magnets, and a plurality of coils, each of the coils being affixed to a side of the case, the elastic element being configured to restrain the frame into an optimal relative position, to limit movement of the frame to a predefined path, the movement being resultant upon an alternating electric current being applied to at least one of the coils, and to transmit the movement between the frame and the case.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings:

FIG. 2 is a simplified block diagram schematically illustrating a second vibration device, according to an example embodiment of the present invention.

FIG. 3 is a simplified block diagram schematically illustrating a third vibration device, according to an example embodiment of the present invention.

FIG. 4 is a simplified block diagram schematically illustrating a fourth vibration device, according to an example embodiment of the present invention.

FIG. 9A is a simplified block diagram schematically illustrating a shoe sole with vibration devices, according to an exemplary embodiment of the present invention.

FIGS. 10A, 10B and 10C are simplified block diagrams schematically and respectively illustrating a tenth, an eleventh, and a twelfth vibration device, according to exemplary embodiments of the present invention.

DESCRIPTION OF THE PREFERRED EMBODIMENTS

Figure 1:
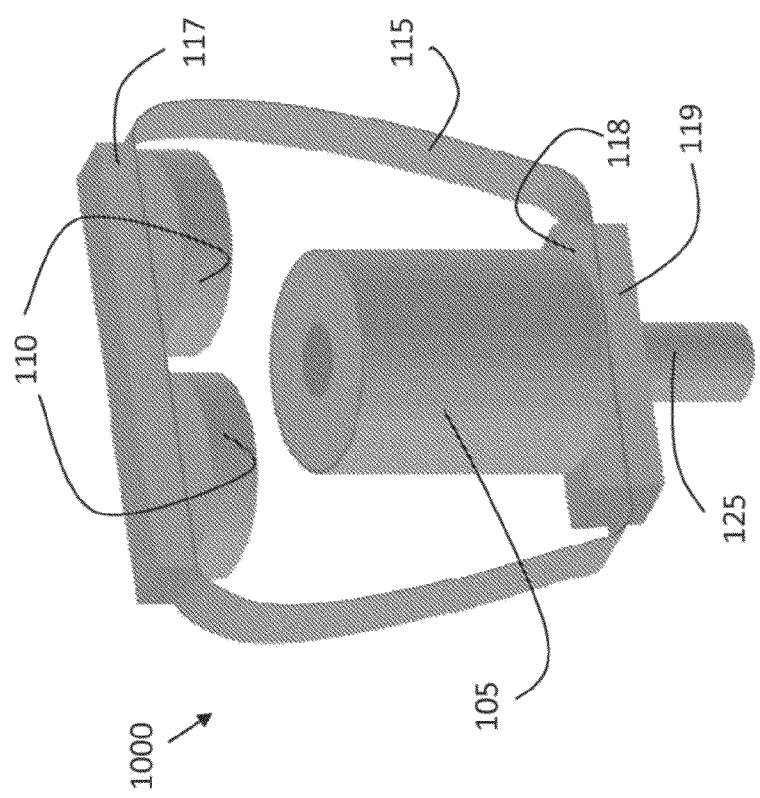
FIG. 1 is a simplified block diagram schematically illustrating a first vibration device, according to an exemplary embodiment of the present invention.

The present embodiments comprise a wearable vibration device which includes at least one partially elastic close shaped frame.

Optionally, the wearable vibration device is used with additional wearable vibration devices, as a part of a media playing apparatus, for enhancing the experience of a user of the media playing apparatus, with low frequency vibrations applied on the user's body, through contact with the vibration devices.

The vibrations may be based on a low frequency signal derived from audio signals of a video clip played on an MP3 player (say a clip by Madonna), and tailored for specific areas of the user's body, as described in further detail hereinbelow.

The vibration device further includes a coil affixed to a first edge of each of the close shaped frames, and an array of one or more magnets, affixed to a second, opposite edge of the close shaped frame.

The close shaped frame restrains the array and coil into an optimal relative position, say into a position in which an axis of the coil is directed to a middle of the array, say in a zero-cross configuration, as described in further detail hereinbelow.

In one exemplary zero-cross configuration, the array includes two magnets and a first magnet's North pole faces a second magnet's south pole. The axis of the coil is directed substantially midway between the two magnets, i.e. opposite the point in which the magnets' magnetic field intensity is maximal, as described in further detail hereinbelow.

Consequently, a vibrational movement initiated upon application of an alternating electric current to the coil, may prove more efficient, as described in further detail hereinbelow.

The close shaped frame limits movement of the array, the coil, or both, to a predefined path and transmits the movement between the array and coil.

Consequently, when a user wears the vibration device on a specific body area, say the wrist, and upon applying an alternating electric current to the coil, the vibration device imparts vibrations on the specific area of a user's body, in a specific direction, say in a direction optimal for the specific area of the user's body, as described in further detail hereinbelow.

The principles and operation of an apparatus and a method, according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified block diagram schematically illustrating a first vibration device, according to an example embodiment of the present invention.

An exemplary vibration device 1000 includes a partially elastic close shaped frame 115 (say a close shaped frame elastic in some parts and rigid in other parts, a close shaped frame with elasticity in specific directions, etc.), as described in further detail hereinbelow.

The vibration device 1000 may be metallic, non-metallic, made of rubber, made of silicon, etc., as described in further detail hereinbelow.

The vibration device 1000 further includes an electric coil 105 affixed to a first edge of the close shaped frame 115.

The vibration device 1000 further includes an array 110 of magnets.

The array 110 includes one or more magnets, affixed to a second, say an opposite edge of the close shaped frame 115. The array 110 includes one or more magnets.

The close shaped frame 115 restrains the array 110 and coil 105 into an optimal relative position. Preferably, the optimal relative position is a relative position in which an axis of the coil 105 is directed to a middle of the array 110, say in a zero-cross configuration, as described in further detail hereinbelow. Whenever the array 110 or coil 105 moves, the close shaped frame 115 works like a spring and pushes the array 110 or coil 105 back to the relative position.

Optionally, in the zero-cross configuration, the array 110 includes two or more magnets.

Optionally, the array 110 includes two or more magnets, and each one of the magnets of the array 110 is oriented vertically (i.e. with a north side up and a south side down, or vise versa).

Optionally, each one of the magnets of the array 110 is oriented horizontally, (i.e. with both poles facing the coil 105).

The close shaped frame 115 further limits movement of the array 110, the coil 105 or both the array 110 and the coil 105, to a predefined path, say a path with a direction optimal for a area on which the vibration device 1000 is supposed to be deployed.

The close shaped frame 115 may further prevent the coil 105 and array 110 from getting close to each other.

The movement is resultant upon application of an alternating electric current to the coil 105, say using an amplifier (not shown) and a power source such as a battery (not shown), which results in a magnetic field formed in the coil 105, with magnetic polarization perpendicular to the coil's 105 core. The close shaped frame 115 transmits the movement between the array 110 and the coil 105, along the close shaped frame's 115 edges.

Optionally, the frame 115 is made of metal. Consequently, the magnetic filed formed in the coil 105 may be strengthened by the metal's ferromagnetism, as known in the art.

Optionally, the first edge, the second edge, or both, is rigid along at least half length of the edge, thus helping to limit the movement of the coil 105, array 110 of magnets, or both, to the predefined path. In one example, the edge is strengthened using one or more rigid metal strips 117-119. In a second example, the close shaped frame 115 is molded with rigidity along a part of the edge, etc.

Potentially, by limiting the movement to the predefined path, there may be also prevented loss of energy due to bending. Further, the limiting of the movement may also protect the close shaped frame 115, and thus prolong life of the vibration device 100.

Optionally, the partially elastic close shaped frame 115 has four edges.

For example, the partially elastic close shaped frame 115 may be in a shape similar to a shape of a polygon or of a compound polygon (say a polygon which may comprise straight edges, arched edges, or both), as described in further detail hereinbelow.

Optionally, the first edge and the second edge are parallel to each other, thus arranging the coil 105 and magnets 110 in a zero-cross configuration, as described in further detail hereinbelow.

The partially elastic close shaped frame 115 is more susceptible to excessive resonance when the two remaining edges are also parallel to each other, just like two parallel walls which are more susceptible to formation of an overly long standing wave when one of the walls is hit by a wave propagating in a direction perpendicular to the wall.

Optionally, the partially elastic close shaped frame 115 has four edges and the first edge and second edge differ in length, thus leaving the two remaining edges unparallel to each other, thereby preventing the excessive resonance of the partially elastic close shaped frame 115.

Optionally, the partially elastic close shaped frame 115 has four edges, and the first edge and second edge are of a same length thus allowing parallelism between the remaining two lines. The parallelism may strengthen resonance of the partially elastic close shaped frame 115, as described in further detail hereinbelow.

Optionally, one or more of the magnets of the array 110 is a coil, as described in further detail and illustrated using FIG. 5, hereinbelow.

Optionally, the vibration device 1000 is designed with a combination of physical characteristics (say weights, sizes, widths, elasticity coefficients, etc.) of the close shaped frame 115, coil 105 and magnets 110, which gives the vibration device 1000 a natural resonant frequency optimal for harmonization with an intended excitation signal.

For example, the combined physical attributes of the close shaped frame 115, coil 105 and array 110 of magnets, may be selected so as to give the vibration device 1000 a natural resonant frequency within a selected range of frequencies of signals. The signals are sent to the vibration device 1000, to excite the vibration device 1000, as described in further detail hereinbelow. Consequently, harmonization of the signals' frequencies and the natural resonant frequency of the vibration device 1000 may yield stronger vibrations in an energetically more efficient manner, as described in further detail hereinbelow.

Optionally, the vibration device 1000 further includes a case (not shown), which houses the close shaped frame 115, coil 105 and array 110. The array of magnets 110 or the coil 105 is affixed to an internal side of the case, say using a fastener 125 such as a screw.

Optionally, the fastener 125 extrudes from the case, and connects to an external element, for imparting the movement (i.e. vibrations) from the case to the external element.

In one example, the external element is an element designed to fit on a specific area of a user's body, on a shoe, or on clothing, say a ring designed to fit around a sole of the user's shoe, a leg bracelet, etc., as described in further detail hereinbelow.

Optionally, the vibration device 1000 further includes a signal receiver (not shown), say an RF radio receiver, a miniature communications card, etc., in communication with the coil 105.

The signal receiver receives a signal and applies an alternating electric current based the received signal on the coil 105, say using an amplifier, thereby applying an excitation signal on the vibration device 1000.

Optionally, the vibration device 1000 further includes a signal processor (not shown), say a dedicated electric circuit for digital signal processing (DSP), or a frequency selective amplifier, in communication with the signal receiver.

The signal processor tailors the received signal to a specific body area on which the vibration device 1000 is to be deployed, say by changing the received signal's waveform or by amplifying only parts of the received signal, as described in further detail hereinbelow.

Optionally, the vibration device 1000 further includes a user interface operable by a user for modifying amplitude of the alternating electric current applied to the coil 105 by the signal receiver, as described in further detail hereinbelow.

Optionally, the vibration device 1000 further includes a user interface operable by a user for selecting one or more radio frequency specific for the vibration device 1000. The signal receiver uses the selected radio frequency for receiving the signal, as described in further detail hereinbelow.

Optionally, the vibration device 1000 further includes a user interface operable by a user for selecting one or more radio frequency specific for a group of vibration devices 1000, as described in further detail hereinbelow. The signal receiver uses the selected radio frequency for receiving the signal, as described in further detail hereinbelow.

Optionally, the received signal is modulated with data of the excitation signal, and the vibration device 1000 further includes a user interface operable by a user for selecting a decoding scheme. The signal receiver uses the selected decoding scheme for extracting the data of the excitation signal from the received signal, as described in further detail hereinbelow.

The user interface(s) may be implemented using hardware (say using dedicated buttons), a touch screen, a computer unit connectable to the vibration device (say using a USB Socket), etc.

Optionally, the vibration device 1000 further includes a USB Socket.

The USB Socket may be used to power the vibration device 1000 or to charge a battery installed in the case of the vibration device 1000, etc., as described in further detail hereinbelow.

The USB Socket may also be used to transmit the signal to the signal receiver through a wire, to assign an IP (Internet Protocol) address to the vibration device 1000, to configure the vibration device 1000, etc., as described in further detail hereinbelow.

The USB Socket may also be used to receive data from the vibration device 1000, say measurement data gathered using sensors installed in the vibration device 1000's case, or next to the case, as described in further detail hereinbelow.

Optionally, the vibration device 1000 includes a computer processor (not shown), in control of the vibration device 1000. The computer processor may be communicated with, using IP (Internet Protocol), using a music industry protocol such as DMX or MIDI, etc., as known in the art.

Optionally, the vibration device 1000 includes two or more partially elastic close shaped frames 115. Each of the frames 115 includes respective magnets 110 and coils 105 affixed to opposite edges of the frame 115, as described in further detail hereinabove.

Reference is now made to FIG. 2, which is a simplified block diagram schematically illustrating a second vibration device, according to an example embodiment of the present invention.

An exemplary vibration device illustrated in FIG. 2, includes a coil 205 deployed on a first edge of a close shaped frame 215 and one or more magnets 210 deployed on a second edge of a close shaped frame 215. The close shaped frame 215 may be made of metal, rubber, silicon, etc.

The frame 215, or at least a part of the frame 215, is elastic, as described in further detail hereinabove.

In the exemplary vibration device of FIG. 2, both the magnets 210 and the coil 205 are deployed on the close shaped frame's 215 inner face.

The magnets 210 are arranged in a zero-cross configuration, say in an array of two magnets 210 in which a first magnet's North pole faces a second magnet's South pole, as described in further detail hereinbelow.

Optionally, each of the magnets 210 is further paired to an opposite magnet 211 deployed on the close shaped frame's 215 outer face.

Consequently, the paired magnets 210 211 stick to each other, and remain attached to the frame 215 between them. Consequently, the vibration device of FIG. 2 may be manufactured without gluing or fastening of the magnets 210 to the close shaped frame 215, thus making the vibration device's manufacturing process faster and cheaper.

Upon supply of an electric current (i.e. an excitation signal) which alternates in low frequency to the coil 205, the coil 205 generates a magnetic field which alternates between opposite polarization directions which are perpendicular to the core of the coil 205 and parallel to the axis of the coil 205. The axis of the coil 205 is directed substantially midway between the magnets 210.

That is to say the alternating magnetic field of the coil 205 is oriented substantially perpendicularly to the array of the magnets 210 and substantially opposite a midway point between the magnets 210. The midway point is a point in which intensity of the magnetic field of the magnets 2110 is optimal, as described for the zero-cross configurations hereinbelow. Consequently, the force between the coil 205 and the magnets 210 is optimized.

Optionally, the close shaped frame 215 is further designed so as to align the coil 205 and magnets 210 in a distance optimized for the specific size of the magnets 210, the specific diameter of the coil 205, the specific strength of the magnets' 210 fields, the average strength of the magnetic field generated by the coil 205, the maximal strength of the magnetic field generated by the coil 205, etc., or any combination thereof.

For example, the coil 205 and magnets 210 may be aligned so as to have the alternating magnetic field of the coil 205 maximize in a point between the midway point and the core of the coil 205, in which the magnetic field of the magnets 210 is optimal.

Optionally, the coil 205 is designed with an optimal diameter, so as to have the alternating magnetic field of the coil 205 maximize in the point between the midway point and the core of the coil 205, in which the magnetic field of the magnets 210 is optimal.

Optionally, the coil 205 is designed with a magnetic field induction which maximizes at an electric current of a low frequency range characteristic of the low frequency signals expected to be received by the vibration device, as described in further detail hereinbelow.

The close shaped frame 215 is designed so as to restrain movement of the magnets 210 over the coil 215. Thus, the movement of the magnets 210 may be constrained to a specific linear or tangential path, for applying vibrations in a direction optimal for a specific body area of a user, as described in further detail hereinbelow.

Optionally, the frame 215 is designed with a natural resonant frequency in a range of vibration frequencies to be transmitted to the vibration device, in order to enable a strengthened and efficient response (i.e. vibrations) to the transmitted signals, as described in further detail hereinbelow.

That is to say that the frame 215 functions as a string having a mechanical resonant frequency in the range of vibration frequencies induced by signals transmitted to the vibration device of FIG. 2, as described in further detail hereinbelow.

Due to harmonization of signals exciting the vibration and the frame's 215 natural resonant frequency (through wave superposition, as known in the art), there is produced an amplified vibratory response.

Consequently, an input sound signal does not require complicated manipulation in order to drive the vibration device of FIG. 2, as the vibration of the vibration device is amplified by the natural resonance of the frame 215. Further, vibrations produced by the vibration device may also provide good fidelity to an original sound that signals transmitted to the vibration device are derived from, as described in further detail hereinbelow.

That is to say that the vibration device's close shaped frame 215 is designed with a natural resonant frequency which is set to be within the range of excitation signals expected to be used for induction of vibrations in the vibration device, in order to enable an efficient mechanical coupling to the excitation signals. Consequently, there are produced stronger vibrations with less exciting energy, as described in further detail hereinbelow.

In one example, when an alternating magnetic current is supplied to the coil 205, the alternating current generates a magnetic field in the core of the coil 205, which works to repel or attract the magnets 210 to the coil 205.

However, the close shaped frame 215 is designed to hold the magnets 210 in a fixed vertical distance from the coil 205. The close shaped frame's 215 vertical resistance coefficient is strong enough to hold the magnets in a fixed vertical distance, away from the coil 205. That is to say that the close shaped frame 215 may prevent any significant movement of the magnets 210 to (or away from) the coil 205 under the magnetic field induced in the coil 205.

Consequently, the frame 215 restricts the movement of the magnets 210 to a significantly horizontal path.

The close shaped frame's 215 design allows movement of the magnets 210 over the coil 2105, along the path. Consequently, the magnetic field induced in the coil 205 moves the magentas 210 significantly horizontally, over the coil 205.

However, the close shaped frame 215 is designed with elasticity which works to bring the magnets 210 back to a central position over the coil 205, in which the midway between the magnets 210 is substantially opposite the core of the coil 205, as described in further detail hereinabove.

As the magnetic field induced in the coil 205, which moves the magnets 210 in one substantially horizontal direction, changes, the frame 215 generates an opposite mechanical force which tends to push the magnets 210 back to the central position. Based on a spring-like rate coefficient which characterizes the frame 215, the magnets 210 movement is limited to a certain distance away from the central position, in which the magnetic force equals the opposite mechanical force generated by the frame 215, as prescribed by Hook's law, as known in art.

Similarly, when the coil's 205 magnetic field polarization changes, the magnets 210 are moved in the opposite direction, until the magnets 210 reach a certain distance away from the central position, in which the magnetic force equals the opposite mechanical force generated by the frame 215, as prescribed by Hook's law.

Consequently, the vibrations of the magnets 210 are characterized by horizontality. Optionally, the vibrations are also characterized by low frequency (in spite of the vibration device's relatively small size).

Reference is now made to FIG. 3, which is a simplified block diagram schematically illustrating a third vibration device, according to an example embodiment of the present invention.

An exemplary vibration device illustrated using FIG. 3 includes the coil 205, magnets 210, and close shaped frame 215 of FIG. 2.

Similarly to the vibration device of FIG. 2, in the vibration device illustrated in FIG. 3, both the magnets 210 and the coil 205 are attached to the close shaped frame's 215 inner face.

However, in the example vibration device of FIG. 3, the magnets 210 are attached to the frame 215 using glue or using a fastener (say a screw), rather than by the opposite magnets 211 of FIG. 2.

Reference is now made to FIG. 4, which is a simplified block diagram schematically illustrating a fourth vibration device, according to an example embodiment of the present invention.

The exemplary vibration device of FIG. 4 includes the coil 205, magnets 210, and frame 215 of FIG. 3. However, in the example vibration device of FIG. 4, the magnets 210 are attached to the frame 215 using glue or using a fastener (say a screw), rather than by the opposite magnets 211 of FIG. 2.

The example vibration device of FIG. 4 further includes a second pair of magnets 412, magnetically attached to the magnets 210 attached to the close shaped frame 215.

Together, the two pairs 210 and 412, form a stronger magnetic array attached to the close shaped frame 215, which upon supplying an alternating electric current to the coil 205, moves back and fourth substantially horizontally, over the coil 205, as described in further detail hereinabove.

According to some exemplary embodiment of the present invention, two or more magnets and/or coils are arranged inside a single vibration device, in an array designed so as to produce a vibration in one or more direction(s) optimal for the body location on which the vibration device is deployed.

In some exemplary embodiments of the present invention, two or more magnets and/or two or more coils are used together in a single vibration device, in a manner which may produce vibrations in two or more directions, in two or three spatial dimensions, etc., as described in further detail and illustrated using FIGS. 7 and 8 hereinbelow.

Figure 5:
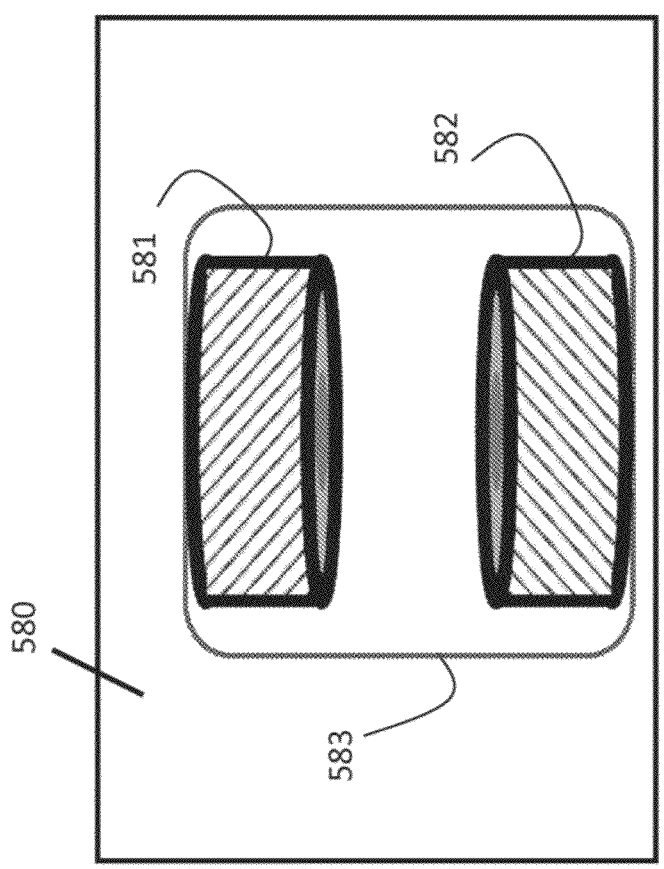
FIG. 5 is a simplified block diagram schematically illustrating a fifth vibration device, according to an example embodiment of the present invention.

Reference is now made to FIG. 5, which is a simplified block diagram schematically illustrating a fifth vibration device, according to an example embodiment of the present invention.

An exemplary vibration device 580 includes two coils 581, 582, affixed to opposite sides of a partially elastic close shaped frame 583. The frame 583 restricts movement of the coils 581, 582, to a specific horizontal movement or to a specific tangential movement.

Upon supplying an alternating electric current to the coils 581, 582, the two coils move back and fourth, in opposite directions. For example, if one coil 581 moves from left to right, the second coil 582 moves from right to left.

Figure 6:
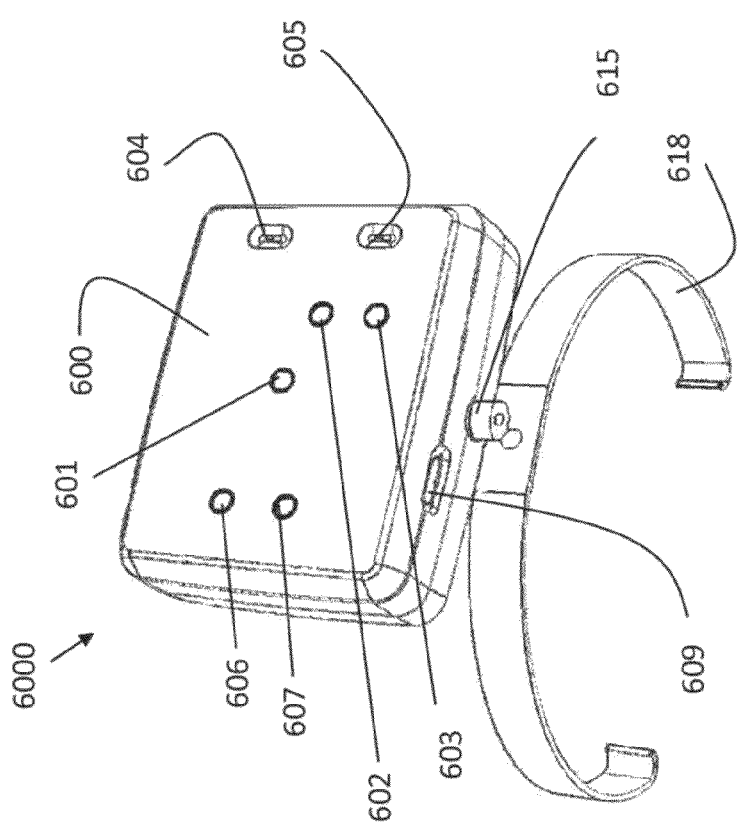
FIG. 6 is a simplified block diagram schematically illustrating a sixth vibration device, according to an exemplary embodiment of the present invention.

Reference is now made to FIG. 6, which is a simplified block diagram schematically illustrating a sixth vibration device, according to an exemplary embodiment of the present invention.

A sixth vibration device 6000, according an exemplary embodiment of the present invention, may include the close shaped frame coil and the magnets, of one of the vibration devices described in further detail and illustrated using FIG. 1-4, hereinabove. The frame, coil, and magnets are housed in a case 600.

The vibration device 6000 further includes a signal receiver, such as an RF radio receiver, a miniature communications card, etc., in communication with the coil, as described in further detail hereinabove.

The signal receiver receives a signal and applies an alternating electric current based the received signal to the coil, say using an amplifier, thereby applying an excitation signal on the vibration device 6000, as described in further detail hereinabove.

The vibration device 6000 further includes, a user interface implemented on the case 600, as an on/off button 601 operable by a user for turning the vibration device 6000 on, turning the vibration device 6000 off, or setting the vibration device 6000 into a stand-by mode, as known in the art.

Optionally, the user interface further includes a volume up button 602 and a volume down button 603. The volume buttons 602, 603, are operable by a user for modifying amplitude of the alternating electric current applied on the coil by the signal receiver, as described in further detail hereinabove.

Optionally, the user interface further includes a group frequency button 604, also positioned on the case 600. The group frequency button 604 is operable by a user for selecting one (or more) radio frequency specific for a group of vibration devices.

The signal receiver uses the selected radio frequency for receiving the signal, as described in further detail hereinabove.

For example, a first media playing system may employ a group of vibration devices worn by a first user of the first system, as described in further detail hereinbelow. A second user may use a similar second system with similar vibration devices, while sitting or dancing next to the first user. Using the group frequency button 604, each of the users may select a separate frequency range for his group of vibration devices, thus avoiding radio interference between vibration devices of different users, as described in further detail hereinbelow.

Optionally, the user interface further includes a device frequency button 605, also positioned on the case 600. The device frequency button 605 is operable by a user for selecting one or more radio frequency specific for the specific vibration device 6000, as described in further detail hereinbelow. The signal receiver uses the selected radio frequency for receiving the signal, as described in further detail hereinabove.

Optionally, the received signal is modulated with data of the excitation signal, and the device frequency button 605 is rather operable by the user for selecting a decoding scheme. The signal receiver uses the selected decoding scheme for extracting data of the excitation signal from the received signal, as described in further detail hereinbelow.

Optionally, the vibration device further includes one or more status indictors 606-607, say LED (Light Emitting Diodes), as know in the art.

Optionally, the vibration device 1000 further includes a USB Socket 609.

The USB Socket 609 may be used to power the vibration device 6000 or to charge a battery installed in the case of the vibration device 6000, etc., as described in further detail hereinbelow.

The USB Socket 609 may also be used to transmit the signal to the signal receiver through a wire, to assign an IP (Internet Protocol) address to the vibration device 6000, to configure the vibration device 6000, etc., as described in further detail hereinbelow.

The USB Socket 609 may also be used to receive data from the vibration device 6000, say measurement data gathered using sensors installed in the vibration device's case 600, or next to the case 600, as described in further detail hereinbelow.

Optionally, the array of magnets, or the coil is affixed to an internal side of the case 600, say using a fastener 615 such as a screw, as described in further detail and illustrated using FIG. 1, hereinabove.

Optionally, the fastener 615 extrudes from the case, and connects to an external element 618, for imparting movement (i.e. vibrations) of the coil or magnets, resultant upon applying of an alternating electric current to the coil (as described in further detail hereinabove), from the case 600 to the external element 618.

In one example, the external element 618 is an element designed to fit on a specific area of a user's body, on a shoe, or on clothing, say a ring designed to fit around a sole of the user's shoe, a leg bracelet, etc.

Optionally, in the example, the external element 618 is designed with a set of static arms, elastic arms, movable arms, or any combination thereof, as known in the art. The arms stabilize the element 618 on the specific area of the user's body, as well as channel the movement (i.e. the vibration) imparted on the external element 618, in a direction optimal for the specific area of the user's body.

Figure 7:
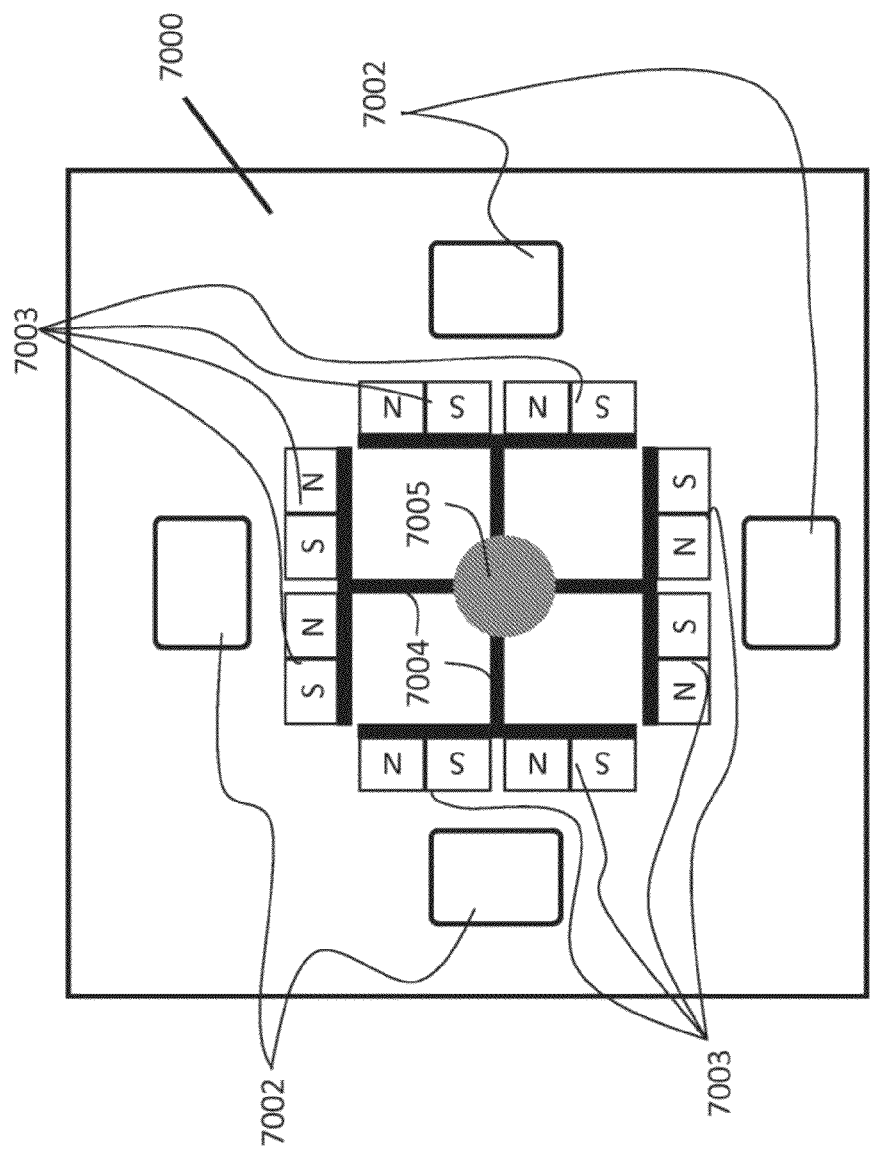
FIG. 7 is a simplified block diagram schematically illustrating a seventh vibration device, according to an example embodiment of the present invention.

Reference is now made to FIG. 7, which is a simplified block diagram schematically illustrating a seventh vibration device, according to an exemplary embodiment of the present invention.

An exemplary multi-directional vibration device 7000 includes two or more coils 7002, say four coils 7002.

The multi-directional vibration device 7000 further includes two or more arrays of magnets 7003.

The multi-directional vibration device 7000 further includes a frame 7004, say a squared frame 7004.

Each of the arrays of magnets 7003 is affixed to a respective edge of the frame 7004. In one example, the arrays 7003 include four pairs of magnets 7003, and each one of the pairs 7003 is affixed to a respective edge of the squared frame 7004.

Optionally, the frame 7004 is rigid along at least half length of each edge to which an array of magnets 7003 is affixed, thus helping to limit the movement of the array of magnets 7003 to a predefined path, as described in further detail hereinbelow. In one example, the edge is strengthened using one or more rigid metal strips. In a second example, the frame 7004 is molded with rigidity along at least a part of the edge, etc.

The frame 7004, magnets 7003, and coils 7002, are housed in a case (not shown), as described in further detail hereinabove. Each of the coils 7002 is affixed to a respective inner side of the case.

Optionally, each one of the pairs 7003 is arranged in a zero-cross configuration, in which a first magnet's North pole faces a second magnet's South pole, as described in further detail hereinbelow.

The frame 7004 is connected to an elastic element 7005. For example, the frame 7004 may be mounted on an elastic element such as a sponge or a spring, positioned in the center of the frame 7004. The elastic element 7005 is connected to the vibration device's 7000 case, say by a fastener.

Alternatively, the frame's 7004 corners, or the frame's 7004 edges may be connected to one or more elastic elements (not shown) connected to the case, say to a few springs arranged around the frame 7004 and connected to different inner sides of the vibration device's case, which allow vertical and horizontal movement of the frame 7004.

The elastic element 7005 restrains the frame 7004 into an optimal relative position. Preferably, the optimal relative position is a relative position in which an axis of each of the coils 7002 is directed to a middle of a respective one of the arrays of magnets 7003.

The elastic element 7005 limits movement of the frame 7004 to a predefined path, the movement resultant upon an alternating electric current applied to one or more of the coils 7002, as described in further detail hereinbelow.

The elastic element 7005 further transmits the movement between the frame 7004 and the vibration device's 7000 case, thus imparting the vibrations to a body of a user who wears the vibration device 7000.

Each of the coils 7002 is deployed opposite one of the edges of the frame 7002. Preferably, the coil 7002 is deployed opposite a point substantially midway between the two magnets forming a pair 7003 affixed to the edge, thus maximizing the magnetic force applied on the magnet pair 7003 when an alternating electric current is applied to the coil 7002, as described in further detail hereinabove.

Consequently, upon supplying an alternating magnetic field to any of the coils 7002, the pair of magnets 7003 affixed to the edge opposite the coil 7002, moves in parallel (or nearly in parallel) to the edge opposite the coil 7002. More specifically, when a coil 7002 positioned opposite the frame's 7004 left edge or the frame's 7004 edge is provided with the current, the magnets 7003 on the edge move vertically (i.e. up or down).

Similarly, when a coil 7002 positioned opposite the frame's 7004 upper edge or the frame's 7004 lower edge is provided with the current, the magnets 7003 on the edge move horizontally (i.e. left or right).

That is to say that the vibration device 7000 of FIG. 7 may be used to induce vibrations in a horizontal direction, in a vertical direction, or in both directions.

By replacing the squared frame 7004 with a cubic frame mounted on an elastic element (or connected to a set of elastic elements, at the frame's 7004 edges), deploying an array of magnets on each edge of the cubic frame, and positioning one or more coil(s) opposite each of the pairs of magnets, there is allowed an induction of vibrations in three spatial directions. For example, the vibrations may be in a left and right direction, in an up and down direction, forwards and backwards, or in any combination thereof.

Optionally, the vibration device 7000 further includes a signal receiver (not shown), say an RF radio receiver, a miniature communications card, etc., in communication with one or more of the coils 7002.

The signal receiver receives a signal and applies an alternating electric current based the received signal to the coil 7002, say using an amplifier, thereby applying an excitation signal on the vibration device 7000.

Optionally, the vibration device 7000 further includes a user interface operable by a user for modifying amplitude of the alternating electric current applied to the coil 7002 by the signal receiver, as described in further detail hereinabove.

Optionally, the vibration device 7000 further includes a user interface operable by a user for selecting one or more radio frequency specific for the vibration device 7000. The signal receiver uses the selected radio frequency for receiving the signal, as described in further detail hereinbelow.

Optionally, the vibration device 7000 further includes a user interface operable by a user for selecting one or more radio frequency specific for a group of vibration devices 7000, as described in further detail hereinbelow. The signal receiver uses the selected radio frequency for receiving the signal, as described in further detail hereinbelow.

Optionally, the received signal is modulated with data of the excitation signal, and the vibration device 7000 further includes a user interface operable by a user for selecting a decoding scheme. The signal receiver uses the selected decoding scheme for extracting data of the excitation signal from the received signal, as described in further detail hereinbelow.

Optionally, the vibration device 7000 further includes a USB Socket.

The USB Socket may be used to power the vibration device 7000 or to charge a battery installed in the case of the vibration device 7000, etc., as described in further detail hereinbelow.

The USB Socket may also be used to transmit the signal to the signal receiver through a wire, to assign an IP (Internet Protocol) address to the vibration device 1000, to configure the vibration device 1000, etc., as described in further detail hereinbelow.

The USB Socket may also be used to receive data from the vibration device 7000, say measurement data gathered using sensors installed in the vibration device 7000's case, or next to the case, as described in further detail hereinbelow.

Figure 8:
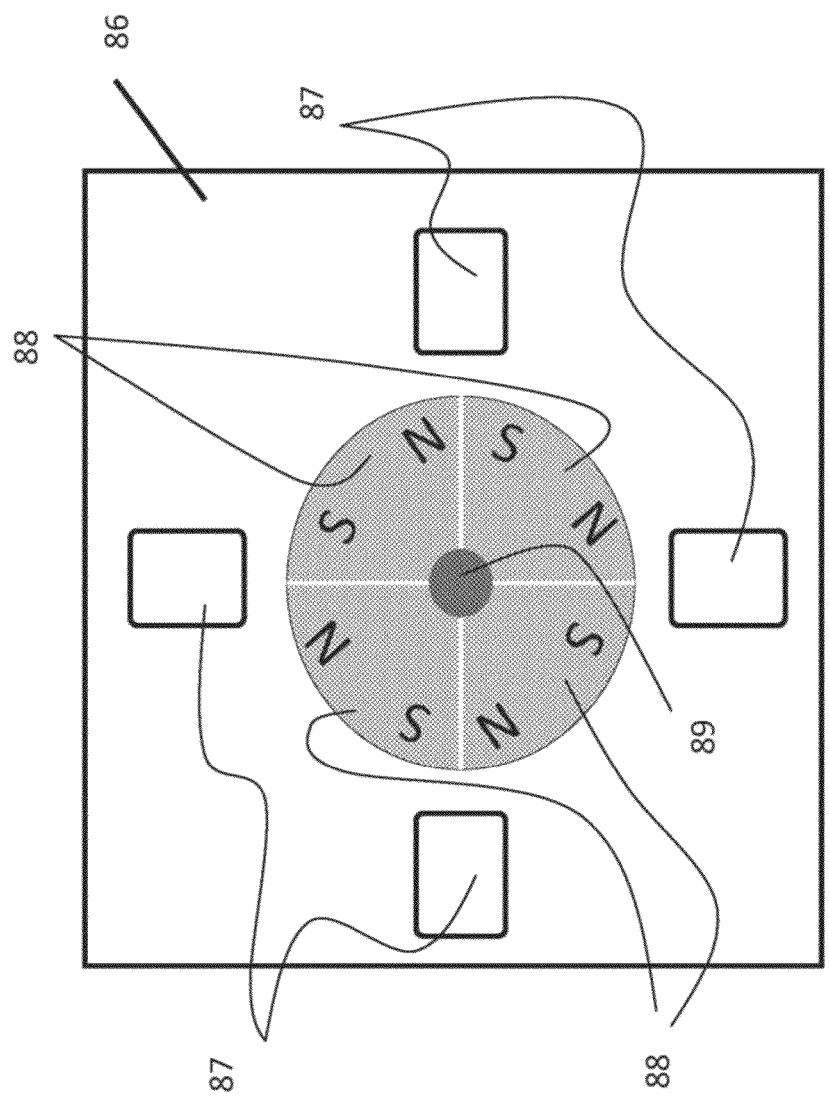
FIG. 8 is a simplified block diagram schematically illustrating an eighth vibration device, according to an example embodiment of the present invention.

Reference is now made to FIG. 8, which is a simplified block diagram schematically illustrating an eighth vibration device, according to an exemplary embodiment of the present invention.

An exemplary multi-directional vibration device 86 includes two or more coils 87, say four coils 87.

The multi-directional vibration device 86 further includes two or more magnets 88, say four magnets 88 held together by the magnets' 88 magnetic fields.

The vibration device 86 further includes a case (not shown), which houses the magnets 88 and the coils 87. Each of the coils 87 is affixed to respective inner side of the case.

The magnets 88 form a mass, say a round mass such as a circle. The round mass of magnets 88 is connected to an elastic element 89 (say a sponge or a set of springs) connected to the vibration device's 86 case.

In one example, the magnets 88 are mounted on the elastic element 89 and form the circle around the elastic element 89. In the example, the elastic element 89 is positioned in the center of the circle.

Optionally, the elastic element 89 restrains the circle formed by the magnets 88 into a position in which an axis of each of the coils 87 is directed to a middle of a respective array of two or more of the magnets 88.

The elastic element 89 limits movement of the circle to a predefined path, the movement resultant upon applying an alternating electric current to one or more of the coils 87, as described in further detail hereinbelow.

The elastic element 89 further transmits the movement between the magnets 88 and the vibration device's 8000 case, thus imparting the vibrations to a body of a user who wears the vibration device 8000.

Alternatively, the magnets 88 form a circle, but are rather connected at the magnets' 88 outer side (say at the circle's circumference), to a set of elastic elements (not shown), say to a few springs that allow vertical and horizontal movement of the magnets 88.

As shown in FIG. 8, each of the coils 87 is deployed opposite a point midway between two adjacent ones of the magnets 88 which are arranged in a zero-cross configuration, as described in further detail hereinbelow.

Upon supplying an alternating electric current to any of the coils 87, the array of magnets 88 opposite the coil 87 moves in parallel (or in near parallel) to the core of coil 87.

More specifically, when a coil 87 positioned opposite the circle's left side or the circle's right side, is provided with the current, the magnets 88 on the side move vertically (i.e. up or down).

Similarly, when a coil 87 positioned opposite the circle's upper side or the circle's lower side is provided with the current, the magnets 88 on the side move horizontally (i.e. left or right).

That is to say that the vibration device 86 may be used to induce vibrations in a horizontal direction, in a vertical direction, or in both directions.

By replacing the magnets 88 with magnets which together, form a sphere around the elastic element (or are connected to, or mounted on an elastic element) there is allowed an induction of vibrations in three spatial directions. For example, the vibrations may be in a left and right direction, in an up and down direction, forwards and backwards, or in any combination thereof.

Optionally, the vibration device 8000 further includes a signal receiver (not shown), say an RF radio receiver, a miniature communications card, etc., in communication with the coils 87.

The signal receiver receives a signal and applies an alternating electric current based the received signal to the coil 87, say using an amplifier, thereby applying an excitation signal on the vibration device 8000.

Optionally, the vibration device 8000 further includes a user interface operable by a user for modifying amplitude of the alternating electric current applied to the coil 87 by the signal receiver, as described in further detail hereinabove.

Optionally, the vibration device 8000 further includes a user interface operable by a user for selecting one (or more) radio frequency specific for the vibration device 7000. The signal receiver uses the selected radio frequency for receiving the signal, as described in further detail hereinbelow.

Optionally, the vibration device 8000 further includes a user interface operable by a user for selecting one (or more) radio frequency specific for a group of vibration devices 8000, as described in further detail hereinbelow. The signal receiver uses the selected radio frequency for receiving the signal, as described in further detail hereinbelow.

Optionally, the received signal is modulated with data of the excitation signal, and the vibration device 8000 further includes a user interface operable by a user for selecting a decoding scheme. The signal receiver uses the selected decoding scheme for extracting data of the excitation signal from the received signal, as described in further detail hereinbelow.

Optionally, the vibration device 8000 further includes a USB Socket.

The USB Socket may be used to power the vibration device 8000 or to charge a battery installed in the case of the vibration device 8000, etc., as described in further detail hereinbelow.

The USB Socket may also be used to transmit the signal to the signal receiver through a wire, to assign an IP (Internet Protocol) address to the vibration device 8000, to configure the vibration device 8000, etc., as described in further detail hereinbelow.

It is noted that in some embodiments of the invention, it may be desirable to use many small vibration devices. An example for such use may be in a sole of a shoe, where a number of small vibration devices can be used—small so as to fit inside a shoe, yet in a number large enough, so as to spread the vibrations over a large part of the sole.

Reference is now made to FIG. 9A, which is a simplified block diagram schematically illustrating a shoe sole with vibration devices, according to an example embodiment of the present invention.

FIG. 9A depicts a sole 900 of a shoe which includes, built in or retro-fitted, a pair of vibration devices 902.

In the example of FIG. 9A, the vibration devices 902 include magnets 905 and coils 910. The coils 910 accept an alternating electric current which causes the magnets 905 to vibrate at low frequency, thus imparting vibrations to a foot of a wearer of the shoe.

The magnets 905 may be permanent magnets, electromagnets, etc., as known in the art.

In some embodiments, the vibrations are imparted to the sole of the foot in a direction transverse to the sole of the foot, whether sidewise, to the front, backwards, or any combination thereof.

Imparting vibrations to the sole of the foot in a direction transverse to the sole of the foot may produce a vibration sensation which is less dependent on a person's pressure on the sole of the foot. A foot unit may be less dependent on a person's weight, on how much weight is placed on each foot, on a person walking about while sensing the vibrations, and so on.

In some embodiments, the foot vibration devices 902 impart vibrations to the sole of the foot in a direction perpendicular to the sole of the foot.

With vibrations imparted to the sole of the foot in a direction perpendicular to the sole of the foot, there may be energy loss to a floor, and the vibration sensation may be uneven during walking.

In some embodiments, the vibration devices 902 include one or more pressure sensing units, for measuring pressure at the sole of the shoe. The pressure sensed may enable modifying amplitude of the low frequency vibrations based, at least in part, on the sensed pressure. The optional modifying is performed so as to produce a substantially equal vibration sensation regardless of pressure on the foot sole.

In some embodiments, the sole 900 is modified so as to lower its contact area against a floor, for example to specific strips or spots. The contact areas of the sole with the floor also press against a user's foot. The vibration devices 902 are optionally located, so as to produce vibration in the minimal contact areas, which press less significantly against the sole.

In some embodiments, the sole 900 has shock absorbers or other pressure manipulation devices or components, built to lessen changes in pressure against the foot sole during stepping, thereby allowing the vibrations imparted by the vibration devices 902 to be felt in a better and more balanced manner.

Figure 9B:
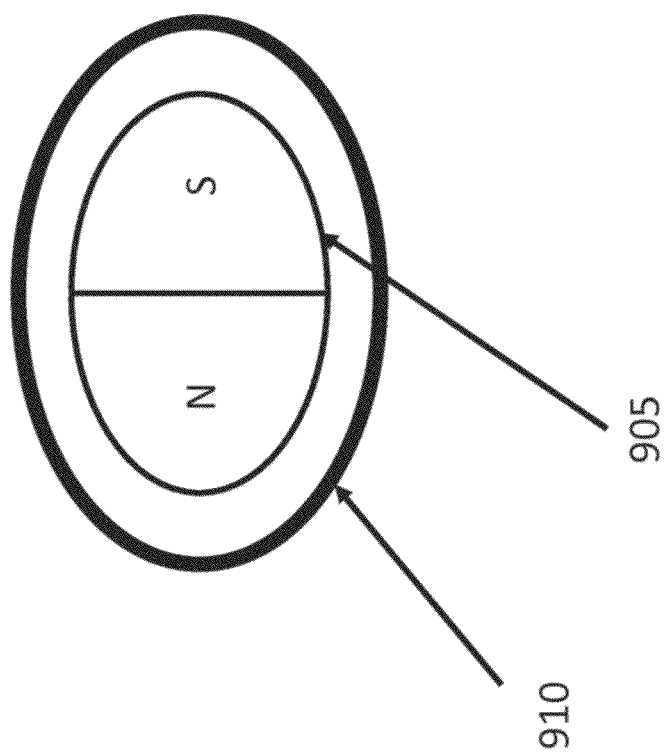
FIGS. 9B and 9C are simplified block diagrams, schematically and respectively illustrating a top view and a side view of a ninth vibration device, according to an exemplary embodiment of the present invention.
Figure 9C:
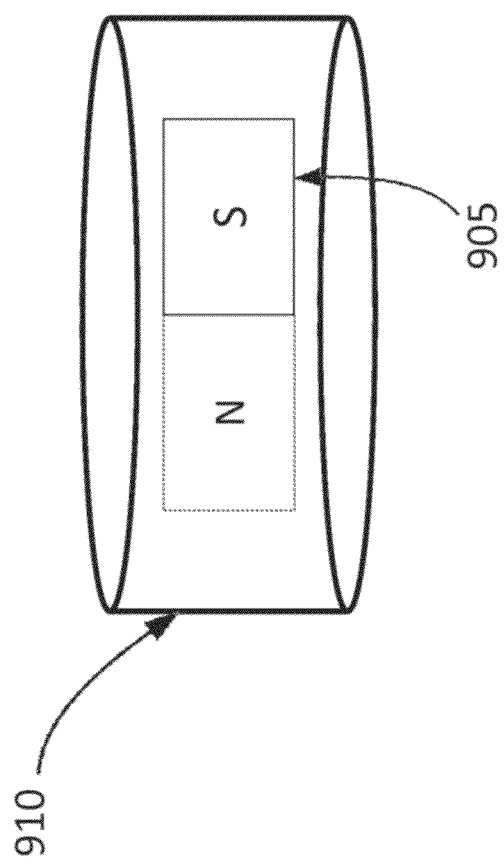

Reference is now made to FIGS. 9B and 9C, which are simplified block diagrams schematically and respectively illustrating a top view and a side view of a ninth vibration device, according to exemplary embodiments of the present invention.

FIGS. 9B and 9C depict the magnets 905 and the coils 910 of the vibration devices 902 built into the shoe sole of FIG. 9A, and their relative positions.

It is noted that the novel vibration device 902 of FIG. 9A-C acts differently than conventional speakers, voice coils, and solenoids. While the speakers, voice coils, and solenoids use a coil to move a mass linearly along an axis defined by a center of their electric coils, the vibration device 902 "wiggles" the magnet 905 about the axis. Optionally, the vibration device 902 is of a compact design, with a moving part (say the magnets 905) which does not extend substantially beyond the coil 910, as described in further detail hereinbelow.

In some embodiments, the magnet 905 and the coil 910 are connected to each other by a partially elastic member, say one of the frames, as described in further detail hereinabove. Some non-limiting examples of the partially elastic member include an elastic membrane, optionally a non-conducting membrane, several elastic arms, etc., as described in further detail hereinabove.

In some embodiments, the magnet 905 and the coil 910 are connected to a supporting frame (not shown). Optionally, the magnet 905, the coil 910 or both, are connected to the supporting frame by an elastic member (not shown).

Reference is now made to FIGS. 10A, 10B, and 10C, which are simplified block diagrams schematically and respectively illustrating, a tenth, an eleventh, and a twelfth vibration device, according to exemplary embodiments of the present invention.

FIG. 10A depicts one exemplary possible flat design for a vibration device.

The example vibration device of FIG. 10A includes a magnet 1020 within a coil 1015. Optionally, both the magnet 1020 and the coil 1015 have a flat design, by way of a none-limiting example, being not more than 1 cm high, 5 mm high, or even not more than 3 mm high.

FIG. 10B depicts an example of a vibration device which uses two magnets 1020, and one coil 1015.

FIG. 10C depicts a yet another example of a vibration device, which uses two coils 1015 and a single magnet 1020.

The vibration devices of FIGS. 10B and 10C are optionally used where more height is available, especially when more power is needed.

Figure 11:
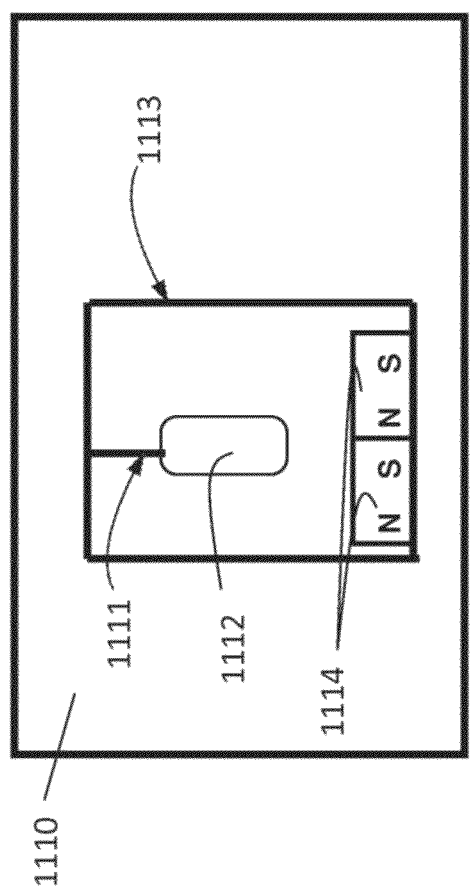
FIG. 11 is a simplified block diagram schematically illustrating a thirteenth vibration device, according to an exemplary embodiment of the present invention.

Reference is now made to FIG. 11, which is a simplified block diagram schematically illustrating a thirteenth vibration device, according to an exemplary embodiment of the present invention.

The example vibration device 1110 of FIG. 11 includes an elastic element, say a spring 1111, connected on one end to a supporting frame 1113 and on the other end to a coil 1112. The vibration device 1110 further includes one or more magnets 1114 optionally connected to the same supporting frame 1113. The spring 1111 is optionally a substantially stiff wire, a flat spring, or structures which are similarly elastic and somewhat resistant to flexing. Optionally, the spring 1111 forms a part of the frame 1113 itself, or the whole frame 1113.

In some embodiments, the coil 1112 and the magnets 1114 are embedded in a flexible substrate (not shown) say in rubber, in a flexible silicone pad, in a gel, or in similar substrates, with or without the above-mentioned spring 1111.

Optionally, the spring 1111, the magnets 1114 and the coil 1112 together, act as a "sprung mass", which has a characteristic natural resonance frequency.

In some embodiments, the spring 1111 is designed with a natural resonant frequency in the range of vibration frequencies induced by a signal received by the vibration device 1110, in order to enable a strengthened and efficient response to the received signal or an excitation signal derived from the received signal, as described in further detail hereinabove.

Consequently, sensations experienced by a user who wears the vibration device 1110, may be enhanced, and the vibration device 1110 may operate in a manner which is energetically more efficient.

That is to say that the vibration device 1110 is designed with a natural resonant frequency which is set to be within a range of frequencies of signals used to induce vibrations on the vibration device 1110, in order to enable an efficient mechanical coupling to the signals used to induce the vibrations. Consequently, there are produced stronger vibrations with less exciting energy, as described in further detail hereinbelow.

With such embodiments, an input sound signal does not require complicated manipulation in order to drive the vibration device 1110, only optionally some amplification, as the vibration is further amplified by the natural resonance of the vibration device's spring 1111. Vibrations produced in such a device 1110, may also provide good fidelity to the original sound.

Further, with such embodiments, the frequency response of the vibration devices, may also allow vibrations induced by a regular sound signal, optionally but not necessarily amplified.

Due to harmonization of the signal exciting the vibration (i.e. the regular sound signal) and the spring's 1111 natural resonant frequency, there may be produced a sufficient and effective vibratory response.

In operation, the coil 1112 optionally receives an optionally amplified changing electric current, and moves relative to a magnetic field produced by the magnets 1114, as described in further detail hereinabove.

The magnets 1114 may be regular permanent magnets, neodymium magnets, electromagnets, etc., as known in the art.

Figure 12:
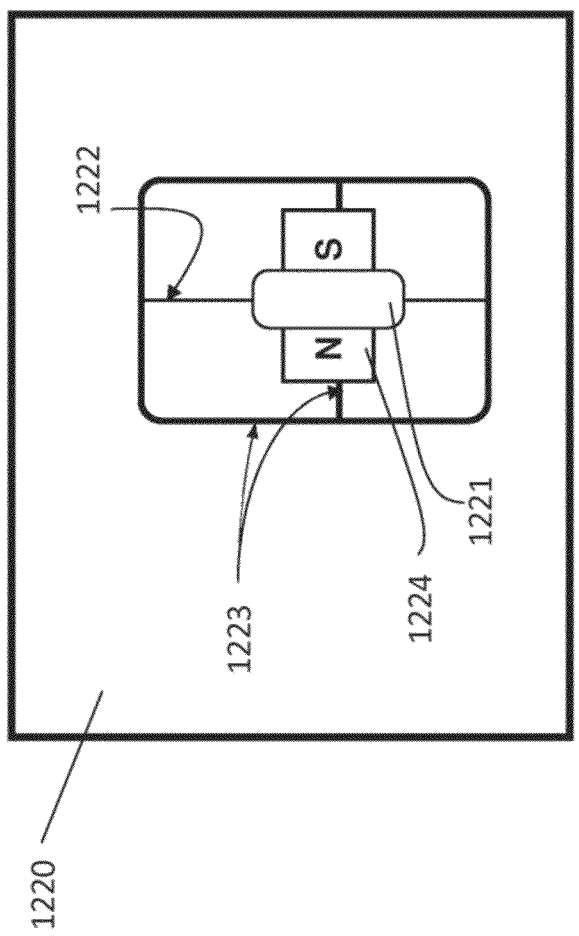
FIG. 12 is a simplified block diagram schematically illustrating a fourteenth vibration device, according to an exemplary embodiment of the present invention.

Reference is now made to FIG. 12 which is a simplified block diagram schematically illustrating a fourteenth vibration device, according to an example embodiment of the present invention.

The vibration device 1220 of FIG. 12 includes a coil 1221 connected by an elastic element such as a spring 1222 to a supporting frame 1223, above a magnet 1224 also connected to the supporting frame 1223.

Upon supply of an alternating electric current to the coil 1221 of the present example, the coil 1221 of the present example moves in a manner similar to the movement of the coil 1112 of the vibration device 1110 of FIG. 11 with a little less headroom, making the present device 1120 better suited for in-shoe and/or under-shoe use.

Figure 13:
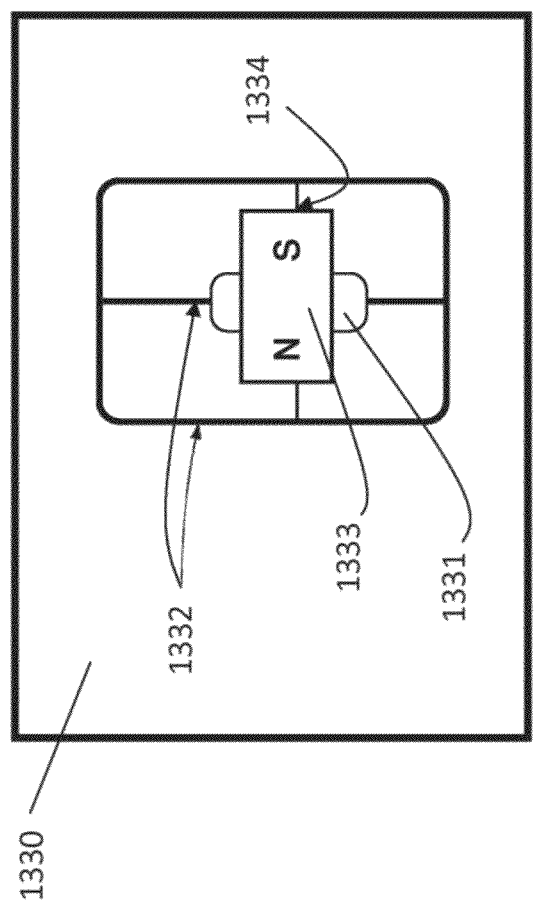
FIG. 13 is a simplified block diagram schematically illustrating a fifteenth vibration device, according to an example embodiment of the present invention

Reference is now made to FIG. 13 which is a simplified block diagram schematically illustrating a thirteenth vibration device, according to an example embodiment of the present invention.

The vibration device 1330 of FIG. 13 includes a coil 1331 connected to a supporting frame 1332.

The exemplary vibration device 1330 also includes a magnet 1333 positioned above the coil 1331. The magnet 1333 is attached to an elastic element, say a spring 1334.

Upon supplying an alternating electric current to the coil 1331, a changing magnetic field is generated in the coil 1331. The changing magnetic field moves the magnet 1333 back and forth, over the coil 1331. Consequently, there are generated vibrations similar to the vibrations of the vibration device 1110 of FIG. 11, with a little less headroom, making the vibration device 1330 better suited for in-shoe and/or under-the-shoe use, as the mechanism and electronic components may optionally be implanted into a shoe sole.

Each of the vibration devices 1110, 1220 and 1330 may have a flat design, in which their coils may optionally be co-planar with their magnets.

The vibration devices 1110, 1220 and 1330 may optionally have a short design, in which their magnets and their coils are not distributed lengthwise along the frame.

Figure 14:
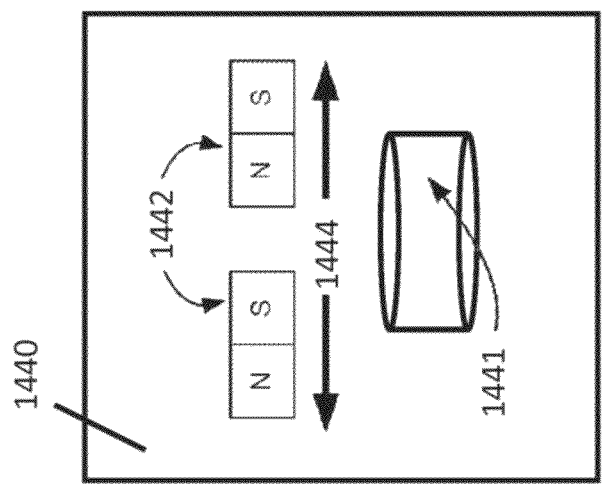
FIG. 14 is a simplified block diagram schematically illustrating a sixteenth vibration device, according to an example embodiment of the present invention.

Reference is now made to FIG. 14, which is a simplified block diagram schematically illustrating a fourteenth vibration device, according to an example embodiment of the present invention.

An exemplary vibration device 1440 includes one coil 1441, and two magnets 1442 arranged in a zero-cross configuration. In the zero-cross configuration, the two magnets 1442 are arranged in an array in which a first magnet's North pole faces a second magnet's South pole. The axis of the coil 1441 is directed substantially midway between the two magnets 1442, i.e. opposite the point in which the magnets' 1442 magnetic field intensity is optimal, as described in further detail hereinbelow. Consequently, there is maximized the magnetic force between the coil 1441 and the magnets 1442, and the vibration device 1440 efficiency may increase.

In an alternative zero-cross configuration, according to an exemplary embodiment of the present invention, a single magnet is used together with one or more coils. In the alternative zero-cross configuration, the axis of the coil(s) is/are directed substantially midway between the magnets poles, i.e. opposite the middle point in which the intensity of the magnet's field is optimal. Consequently, there is optimized the magnetic induction between the coil(s) and the magnet, and the vibration device efficiency may increase.

As described hereinabove, the coil 1441, the magnets 1442, or both, may be connected to a support frame (not shown), to each other (or both), by a partially elastic frame (not shown), etc.

Movement induced by signals applied to the coil 1441 may accelerate the coil 1441, or the magnets 1442.

The acceleration causes movement which may optionally be constrained to be in one direction or another, say for imparting the vibration in a direction which is optimal for the body area on which the vibration device 1440 is deployed, as described in further detail hereinabove.

For example, the magnets 1442 may optionally be constrained, say by the frame or by a mechanical element which connects the coil 1441 and the magnets 1442, to move only in a specific horizontal direction or in a specific tangential movement, over the coil 1441, as indicated by the arrow 1444 of FIG. 14.

Figure 15:
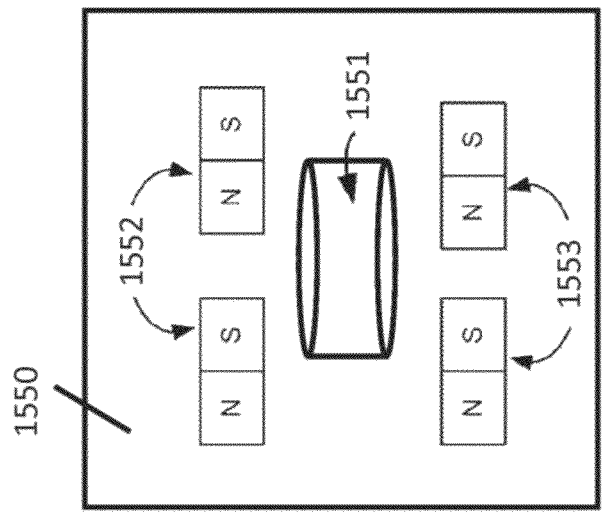
FIG. 15 is a simplified block diagram schematically illustrating a seventeenth vibration device, according to an example embodiment of the present invention.

Reference is now made to FIG. 15, which is a simplified block diagram schematically illustrating a fifteenth vibration device, according to an example embodiment of the present invention.

An exemplary vibration device 1550 includes one coil 1551 and two pairs of magnets 1552, 1553, arranged in a zero-cross configuration. In the zero-cross configuration, each pair of magnets 1552 1553 is arranged so that a first magnet's North pole faces a second magnet's South pole. Further, the two pairs of magnets 1552 1553 are arranged so as to have their North and South poles face in the same direction.

Similarly to FIG. 14, both pairs 1552 1553 of magnets, are constrained (say using a partially elastic frame), and move in a specific horizontal direction or in a specific tangential movement. However, when one pair 1552 moves in one direction (say from left to right), the second pair 1553 moves in an opposite direction (say from right to left).

Figure 16:
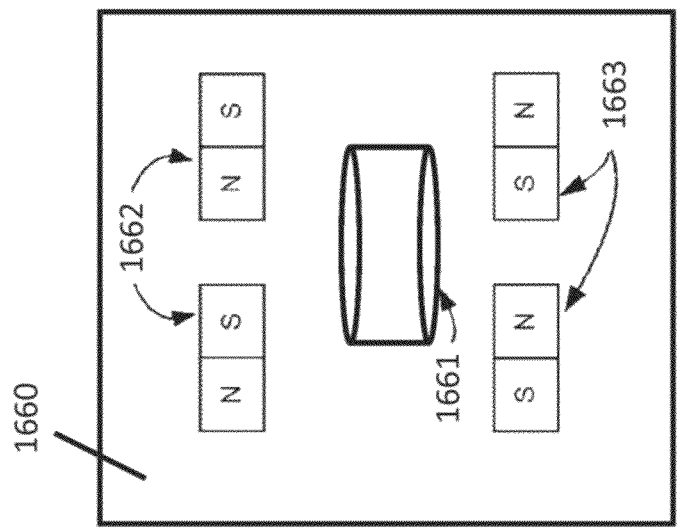
FIG. 16 is a simplified block diagram schematically illustrating an eighteenth vibration device, according to an example embodiment of the present invention.

Reference is now made to FIG. 16, which is a simplified block diagram schematically illustrating a sixteenth vibration device, according to an example embodiment of the present invention.

An exemplary vibration device 1660 includes one coil 1661 and two pairs of magnets 1662 1663, arranged in a zero-cross configuration in which each pair of magnets 1662 1663 is arranged so that a first magnet's North pole faces a second magnet's South pole. The two pairs of magnets 1662 1663 are arranged so as to have their North and South poles face in opposite directions.

Similarly to FIG. 15, both pairs 1662 1663 of magnets, constrained say using a frame, move in a specific horizontal direction or in a specific tangential movement. However, when one pair 1662 moves in one direction (say from left to right), the second pair 1663 moves in the same direction (also from left to right).

Figure 17:
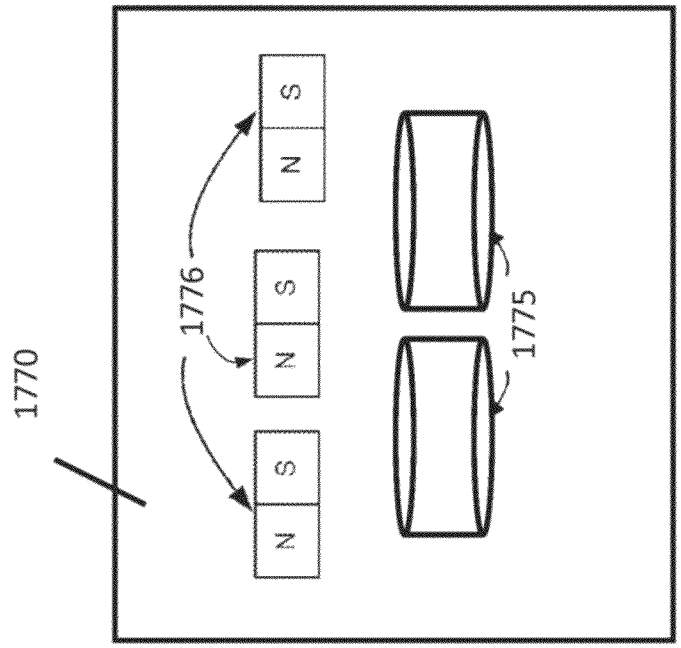
FIG. 17 is a simplified block diagram schematically illustrating a nineteenth vibration device, according to an example embodiment of the present invention.

Reference is now made to FIG. 17, which is a simplified block diagram schematically illustrating a seventeenth vibration device, according to an example embodiment of the present invention.

An exemplary vibration device 1770 includes two coils 1775 and three magnets 1776, arranged in a zero-cross configuration. FIG. 17 serves to demonstrate that the number of magnets 1776 does not have to be even. It is also noted that the number of coils 1775 also does not have to be even.

Optionally, the magnets 1776 are dispersed inside the vibration device 1770, such that the direction of vibration of each magnet and coil may differ from the direction of vibration of the other magnets or coils. Consequently, the vibration device 1770 may rotate in various directions, as described in further detail hereinbelow.

Figure 18:
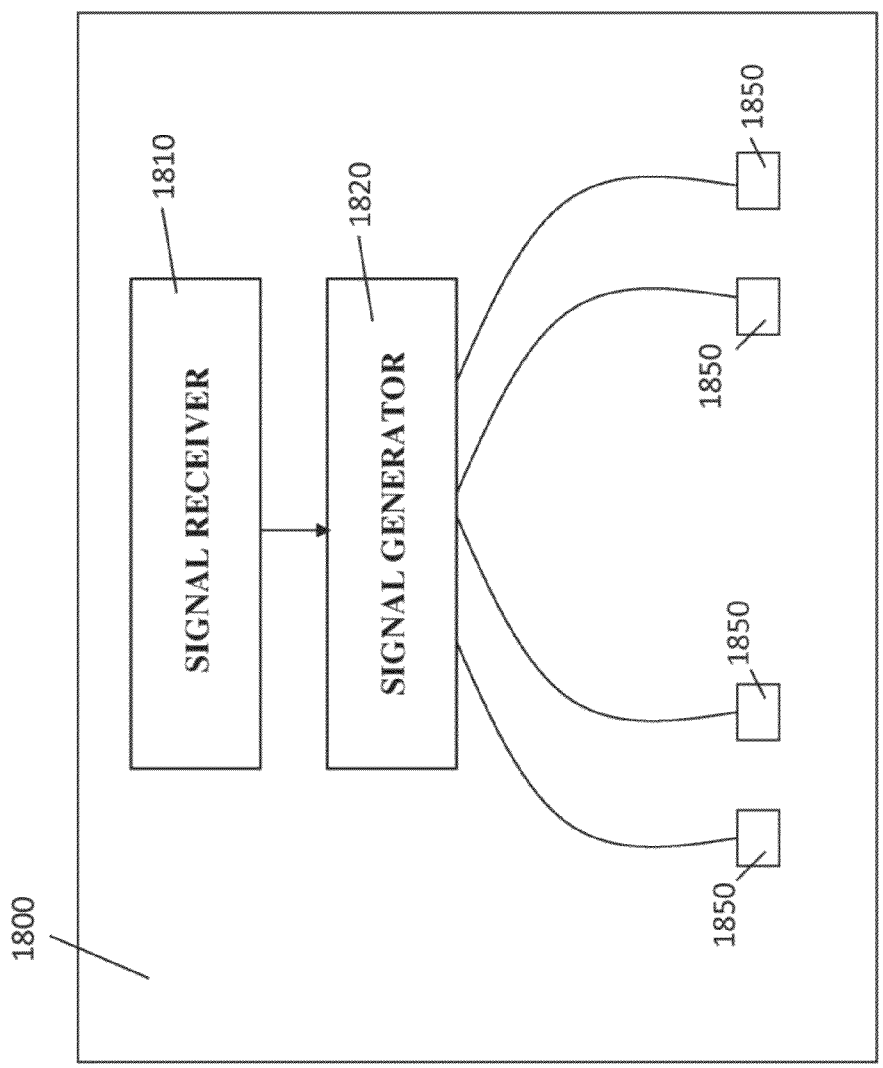
FIG. 18 is a simplified block diagram schematically illustrating a first system for personal media playing, according to an exemplary embodiment of the present invention.

Reference is now made to FIG. 18, which is a simplified block diagram schematically illustrating a first apparatus for personal media playing, according to an exemplary embodiment of the present invention.

An exemplary apparatus 1800, for personal media playing, according to an exemplary embodiment of the present invention, may be implemented as hardware, or as a combination of hardware and software.

The apparatus 1800 (or at least some parts of the apparatus) may be worn by a user of the apparatus 1800, as described in further detail hereinbelow.

The apparatus 1800 includes a signal receiver 1810.

The signal receiver 1810 receives a media signal, say of a soundtrack of a movie, a video clip played on an MP3 player, a video stream, etc.

The signal receiver 1810 receives the media signal from an audio source, such as an MP3 Player (say through the player's headphone socket), a computer, a game console, a media reader such as a CD-ROM or a DVD (Digital Video Disc) drive, a smart phone (say Apple™ i-Phone), etc., as known in the art.

The signal receiver may 1810 receive the media signal through a wireless connection to the audio source, through a wired connection to the audio source, through a socket such as a USB Socket of the audio source, or through any combination thereof, as described in further detail hereinbelow.

Optionally, the apparatus 1800 further includes an external RF transmitter (not shown), which may be connected to the audio source through an audio socket or through a USB socket. The external RF transmitter transmits the media signal to the signal receiver through a radio frequency connection, as known in the art.

The apparatus 1800 further includes a signal generator 1820, in communication with the signal receiver 1810.

Optionally, the signal generator 1820 is implemented on a dedicated Digital Signal Processing (DSP) chip, on a desktop computer, on a laptop computer, on a mobile smart phone, etc., as known in the art.

The signal generator 1820 derives two or more, signals from the media signal received by the signal receiver 1810. The derived signals may be similar, or different from each other.

Optionally, the derived signals are low frequency signals. The low frequency signals are signals with frequencies that the human ear is much less sensitive to, whereas other parts of the human body are much more sensitive to (say through touch).

The signal generator 1820 tailors each of the derived signals for a respective one of a plurality of body areas of a user of the apparatus 1800, as described in further detail hereinbelow.

Optionally, the signal generator 1820 derives the signals for a preset number of body areas, say a number preset by a user or a manufacturer of the apparatus 1800, whereas the media signal's recording may be based on a different number of channels.

In one example, the media signal originates from a hand held stereo media player with two channels, and the signal generator 1820 derives eight channels from the media signal, for eight body areas of a user.

In the example, the signal generator 1820 may tailor one of the derived signals for a specific body area in which bone is close to skin (say one of the legs), while tailoring another one of the derived signals for a more fleshy body area, such as the waist, as described in further detail hereinbelow.

The apparatus 1800 further includes two or more vibration devices 1850, in communication with the signal generator 1820, through a wired or wireless connection, and worn by the user of the apparatus 1800, as described in further detail hereinabove.

Each of the vibration devices 1850 may be similar to any one of the exemplary vibration devices described in further detail hereinabove.

Optionally, at least one of the vibration devices 1850 is wireless and the signal generator 1820 communicates with the vibration device 1850 through a wireless connection, using one radio frequency, as described in further detail hereinabove.

Optionally, the signal generator 1820 communicates with each of the vibration devices 1850 using a device specific radio frequency, or a radio frequency range specific to each specific apparatus's 1800 group of vibration devices 1850, as described in further detail hereinabove. For example, when many users use similar apparatuses 1800 close to each other, the signal generator 1820 may communicate with each group of vibration devices 1850, using a radio frequency specific to the group, as described in further detail hereinabove.

Optionally, each of the vibration devices 1850 may include a user interface (say a dedicated button) operable by a user, for selecting a radio frequency, or a radio frequency range specific for the vibration device 1850 or for a group of the vibration devices 1850 used by a same user or a same group of users. Each of the vibration devices 1850 uses the selected radio frequency range for receiving the signals derived by the same signal generator 1820, as described in further detail hereinabove.

Optionally, each of the vibration devices 1850 may include a user interface (say a dedicated button) operable by a user, for selecting a decoding scheme, specific to the vibration device 1850 or to a group of the vibration devices 1850 used by a same user or a same group of users.

The vibration device 1850 uses the selected decoding scheme, for extracting data from the signals derived by the same signal generator 1820. The signal generator 1820 modulates the signals with data, as a part of tailoring the signals, before sending the signals to the vibration device 1850, over a wireless connection, as described in further detail hereinabove.

In some embodiments, the wireless connection is a limited range connection, with a useful range of 5-6 meters, or even 2-3 meters. In some other embodiments, the wireless connection is a limited range connection, with a useful range of 10-20 meters, or 30 meters.

Optionally, the signal generator 1820 transmits the tailored signals to the vibration devices 1850, over a wired network, say a network in which each one of the vibration devices 1850 is assigned a unique address, say an IP (Internet Protocol) address, as described in further detail hereinabove.

Each one of the vibration devices 1850 (or a sub-group of the vibration devices 1850), may be deployed on a respective one of the body areas of the user, and vibrate on the body area, according to the signal tailored for the respective body area.

The tailoring of the derived signals may include one or more of a variety of signal manipulations.

The signal manipulations may include, but are not limited to: insertion of a certain signal sequence into the derived signal, changing the derived signal's waveform, compressing certain parts of the derived signal, filtering and equalization of specific frequency ranges, introduction of delays among signals derived from the media signal, for different body areas, etc., as described in further detail hereinbelow.

That is to say that the signal generator 1820 may optimize each of the tailored signals for a specific body area, as described in further detail hereinbelow.

Optionally, the signal generator 1820 tailors the signal derived from the media signal, with a waveform optimal for the body area.

For example, the signal generator 1820 may tailor a derived signal destined for one of the user's hands, with an asymmetric waveform characterized by a relatively rapid elevation (also referred to as an attack) of amplitude, and a relatively slow decay of the amplitude, or vise versa.

Consequently, upon application of vibrations based on the signal tailored with the asymmetric waveform, on the user's hand, there is generated a movement-like sensation on the user's hand. Further, the movement-like sensation is likely to cause the user to respond with a real feed-back movement, in a direction opposite the movement-like sensation (for a pushing sensation) or in the sensation's direction (for a pulling sensation).

Optionally, the signal generator 1820 tailors the signal derived from the media signal, with a frequency, or a frequency range, optimal for the body area to which the signal is destined, as described in further detail hereinbelow.

Optionally, the signal generator 1820 tailors the signal derived from the media signal, by inserting a predefined sequence to the derived signal.

For example, the signal generator 1820 may insert a specific signal sequence stored in a dedicated database of vibration effects (say a sequence typical of a boom effect) to the derived signal, whenever the signal generator 1820 identifies a predefined sequence (say a sound typical of an explosion) in the media signal.

Optionally, the signal generator 1820 tailors the derived signals, so as to simulate a specific environment, such as an open air environment, a closed hall environment, a car with powerful low frequency speakers, an environment with a wood floor, an environment with a concrete floor, etc.

For example, the signal generator 1820 may insert a sequence of floor vibrations to the derived signal.

Optionally, the signal generator 1820 is preconfigured with specific amplifications, delays or phase differences, based on measurements made on a user's body locations during a live sound experience in a specific environment. The signal generator 1820 may tailor the derived signals for the specific environment, using the specific amplifications, delays or phase differences, as measured in the specific environment.

Optionally, the user of apparatus 1800 is allowed to select one the environments, say using a control panel, for the signal generator 1820 to tailor the derived signals for.

The media signal may be a signal produced upon playing of a standard, one of millions of currently available media items, such as music clips, video clips, or movie soundtracks.

That is to say that the signal generator 1820 may tailor the derived signals, using the media item as originally recorded.

No need for a producer of the media item, to re-mix the media with special vibration channels or with a new distribution among recording channels, or to provide a complement mix of vibration channels, in order for the current apparatus 1800 to work.

That is to say that media items originally mixed for traditional platforms, such as a standard stereo system or a regular MP3 Driver, need not be modified or remixed, for the exemplary apparatus 1800 to work.

Optionally, the vibration device 1850 vibrates on the body area, in a manner optimal for the body area.

For example, the vibration device 1850 may vibrate in direction optimal for the body area.

In the example, the vibration device 1850 may vibrate in a direction which best suits the specific body area that the vibration device 1850 is deployed on, say in a direction perpendicular to a fleshy body area of a wearer the apparatus 1800, or transversely to a boney body area of the wearer, as describe in further detail hereinbelow.

Optionally, the vibration device 1850 itself further includes a signal tailoring capacity (say a dedicated electric circuit for signal processing, or a frequency selective amplifier), as described in further detail hereinabove.

Using the signal tailoring capacity, the vibration device 1850 may further tailor the tailored signal for the specific area, as received by the vibration device 1850, say by further changing the received signal's waveform or by amplifying only parts of the signal that are in a low frequency range, as described in further detail hereinabove.

Optionally, the signal generator 1820 further introduces a phase difference between at least two signals derived and tailored for different body areas of the user, say for generating a sensation which moves up from a lower body area to a higher body area, or vise versa.

Optionally, the signal generator 1820 further uses control data embedded in the received media signal in accordance with a predefined protocol, for tailoring the derived signals. For example, the signal generator may introduce a certain signal sequence to the signal derived from the media signal, upon identifying a certain tone in the media signal received by the signal receiver 1810, as described in further detail hereinbelow.

Optionally, the apparatus 1800 further includes a control panel, say a set switches or a touch screen, in communication with the signal generator 120.

The control panel provides a user interface which may be operated by a user of the apparatus 1800, for controlling the signal generator 1820.

The user may use the control panel for adjusting the amplitude of a signal tailored for a specific body area (say the user's chest), thereby moderating the vibrations felt on the user's chest, adjust the amplitude of the tailored signals in general, etc., as described in further detail hereinbelow.

Optionally, the vibration device 1850 itself may have a user interface which may be operated by a user of the apparatus 1800, say for adjusting the amplitude of vibrations applied on the specific area on which the vibration device 1850 is deployed, as described in further detail hereinabove.

Optionally, the apparatus 1800 further includes an audio signal generator (not shown), in communication with the signal receiver 1810.

The audio signal generator derives an audio signal from the received media signal, thus reproducing at least a part of the media signal, for the user to hear.

Optionally, the audio signal generator forwards the audio signal derived from the media signal to a loudspeaker, or to headphones, used by the user who wears the apparatus 1800.

For example, the audio signal generator may identify audio signals in an MP4 media signal, and forward the identified audio signals to a loudspeaker, or to headphones, as described in further detail hereinbelow.

Figure 19:
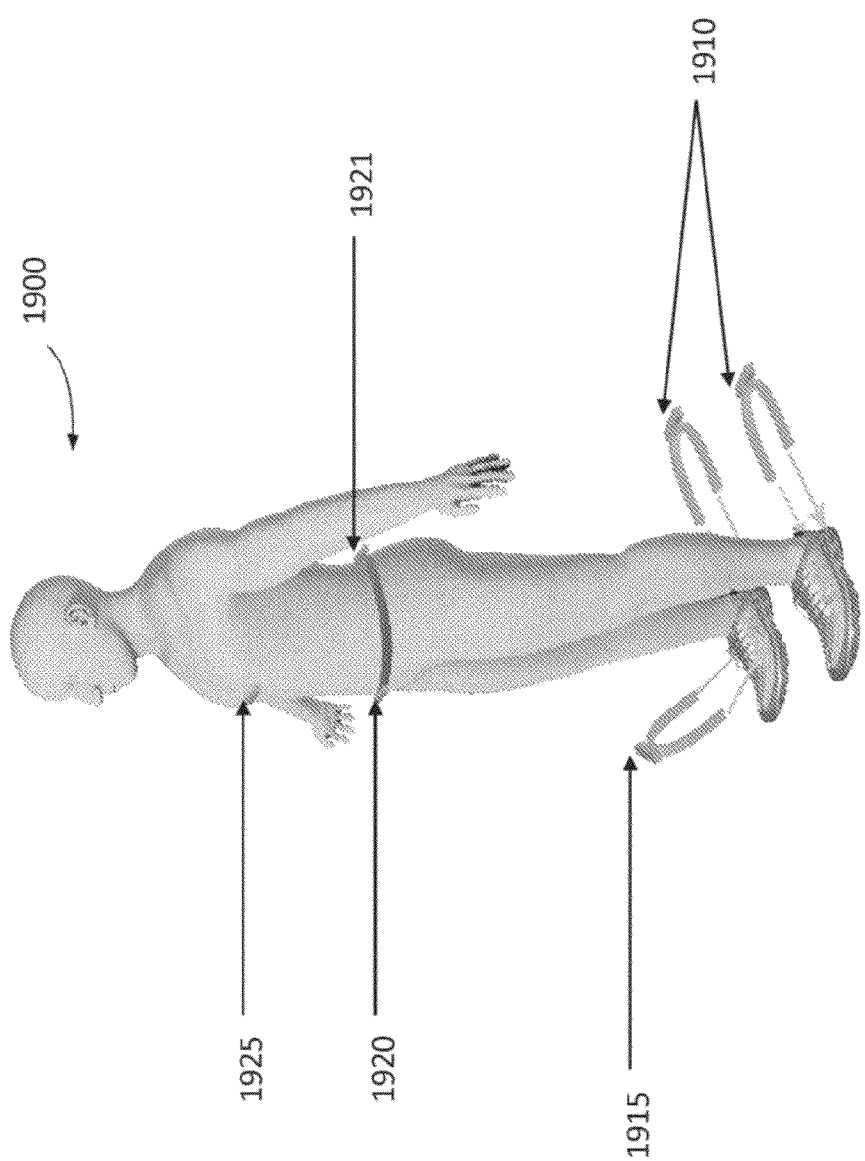
FIG. 19 is a simplified block diagram schematically illustrating a second system for personal media playing, according to an exemplary embodiment of the present invention.

Reference is now made to FIG. 19, which is a simplified block diagram schematically illustrating a second apparatus for personal media playing, according to an exemplary embodiment of the present invention.

A second exemplary apparatus, according to an exemplary embodiment of the present invention, includes several units worn by a person 1900.

Each unit houses one or more vibration device(s), say one of the exemplary vibration devices, as described in further detail hereinabove.

FIG. 19 is brought here to illustrate one exemplary way for a person to use an apparatus, according to an exemplary embodiment of the present invention, and to illustrate possible portability of the apparatus as well as a possible personal sound experience provided by the apparatus, as opposed to a sound experience in a club.

Note that the person 1900 is not shown wearing headphones, although some embodiments of the present invention do include an audio connection for headphones.

The person 1900 is depicted wearing an exemplary pair of a first type of a foot vibration device 1910, intended to fit around a sole of the person's shoe and produce vibrations according to low frequency signals sent to the foot vibration device 1910, as described in further detail hereinbelow.

The person 1900 is also depicted wearing a second type of a foot vibration device 1915, intended to fit on top of the person's shoe. The second type of foot vibration device 1915 is also used in a pair, though only one is shown in FIG. 19, for simplicity of depiction.

The first type of a foot vibration device 1910 and the second type of a foot vibration device 1915 are not normally used together. The two are depicted together, for illustration purposes only.

In some embodiments of the present invention, the foot vibration devices are designed to attach to a foot with an elastic band (not shown), to an elastic sock (not shown), etc.

In some embodiments of the present invention, foot vibration devices are designed to be located next to a foot by being produced as an under-the-foot shoe insert (not shown) similar to an orthopedic insert.

The person 1900 is depicted wearing a waist vibration device 1920, intended to produce vibrations according to low frequency signals sent to the waist vibration device 1920, as described in further detail hereinbelow.

The person 1900 is depicted wearing another waist vibration device 1921. In some embodiments of the present invention, two or more waist vibration devices are used. In other embodiments, only one waist vibration device 1921 is used, and the waist vibration device 1921 may be placed at different locations around the waist.

The person 1900 is depicted wearing a chest vibration device 1925, intended to produce vibrations according to low frequency signals sent to the chest vibration device 1925. The chest vibration device 1925 is optionally deployed next to the sternum, or chest bone.

According to some embodiments of the present invention, one or more vibration devices is deployed on a high sensitivity body area, such as the tail bone (coccyx) or another spine area, for imparting vibration sensations on the high sensitivity body area.

According to some embodiments of the present invention, the vibration devices may be deployed on body areas selected according to user preferences, known body acoustic meridians and pressure locations, etc.

In some of the embodiments, an area specific vibration is imparted to each respective area among carefully selected body areas of a user.

The vibration may have area-specific characteristics such as a specific direction (say in a specifically selected angle to the body surface), a position specific waveform, etc., as described in further detail hereinbelow.

An additional body area which may be used is the back, optionally against the spine, say in a position directly opposite the user's chest.

According to some embodiments of the present invention, the user picks and chooses which body part to use for experiencing the vibrations. By way of a non-limiting example, the user may choose to go without the foot vibration device while jogging.

Figure 20:
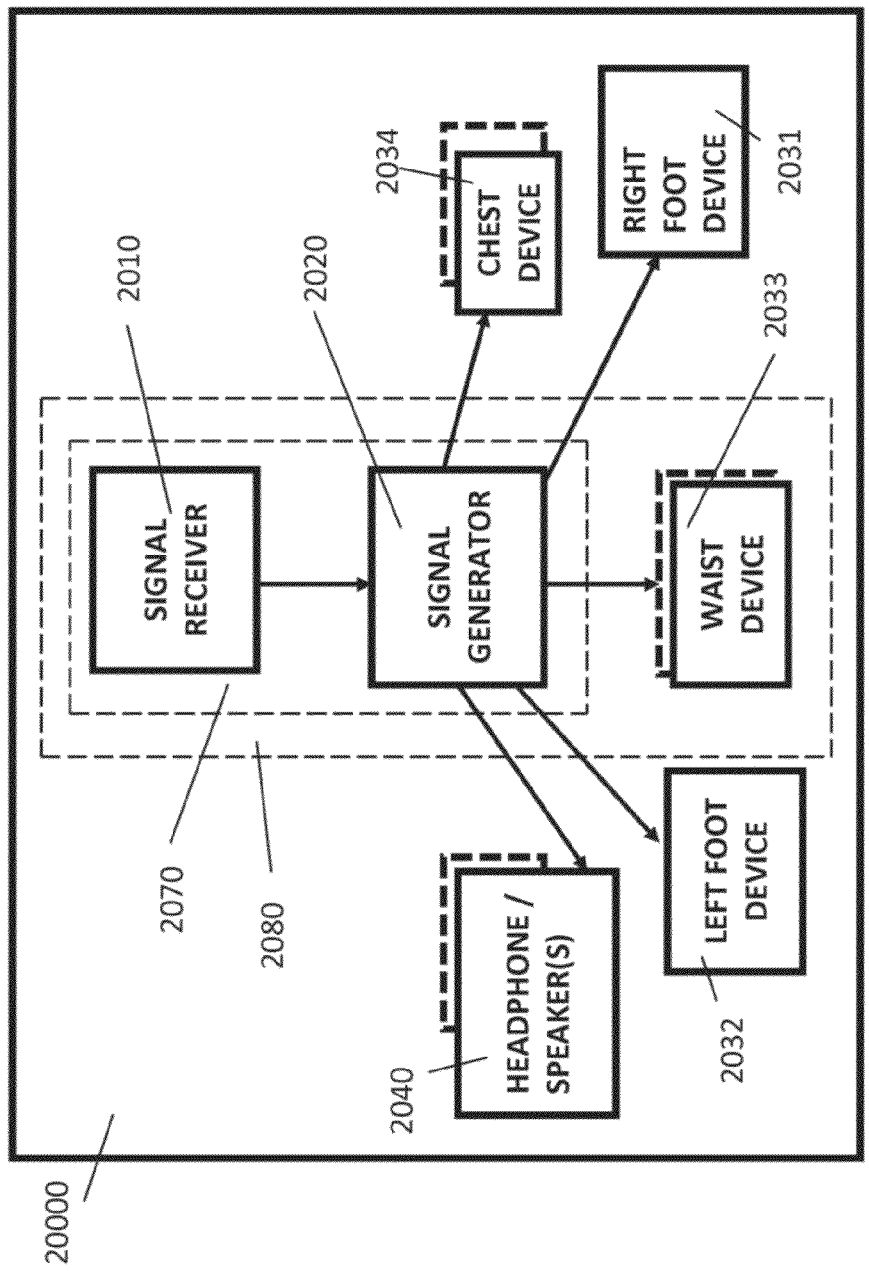
FIG. 20 is a simplified block diagram schematically illustrating a third system for personal media playing, according to an exemplary embodiment of the present invention.

Reference is now made to FIG. 20, which is a simplified block diagram schematically illustrating a third apparatus for personal media playing, according to an exemplary embodiment of the present invention.

An exemplary third apparatus 20000 is a wearable apparatus which includes a media signal receiver 2010, a signal generator 2020, and several vibration devices 2031-2034, as described in further detail hereinabove.

The vibration devices 2031-2034 may include, but are not limited to one or more of the following: a right foot vibration device 2031, a left foot vibration device 2032, one or more waist vibration devices 2033, and one or more chest vibration devices 2034.

The apparatus 20000 may further include an audio signal generator (not shown), as well as one or more headphone(s) or speaker(s) 2040, so as to allow a wearer to hear audio signal simultaneously to application of vibrations on the wearer's body, as described in further detail hereinabove.

In some embodiments, the media signal receiver 2010 includes an actual source of sound signals, such as, by way of a non-limiting example, a personal audio player, a radio receiver, and so on.

The media signal receiver 2010 may include either only a low frequency channel or both a low frequency channel and one or more normal bandwidth audio channels.

In some embodiments, the low frequency channel is a standard LFE (Low Frequency Effects) channel, as known in the art.

In some embodiments, the media signal receiver 2010 provides a pass-through to the low frequency channel or channels described hereinabove. In some embodiments, the media signal receiver 2010 filters low frequencies from the received sound signal.

The media signal receiver 2010 is connected to the signal generator 2020, and forwards the received sound signals or low frequency parts thereof to the signal generator 2020.

The signal generator 2020 derives low frequency signals from the signal(s) received from the media signal receiver 2010, and tailors each of the derived low frequency signals for a specific area on a user's body.

In the instant example, the signal generator 2020 tailors the low frequency signals for the waist, chest, right foot or left foot, on which each of the vibration devices 2031-2034 is deployed, as described in further detail hereinabove.

Then, the signal generator 2020 sends the tailored signals to the respective vibration device 2031-2034.

Optionally, the signal generator 2020 produces coordinated low frequency signals tailored for inducing location-specific vibrations at a plurality of locations on a user's body.

In some embodiments, the signal generator 2020 filters low frequencies from the signals provided by the media signal receiver 2010.

In some embodiments, the signal generator 2020 does not filter low frequencies from signals provided by the media signal receiver 2010.

Optionally, the vibration devices 2031-2034 accept unfiltered signal and amplifiers inside the vibration devices 2031-2034 filter and amplify only low frequency signals. Alternatively, the vibration devices' amplifiers amplify all non-filtered signals, and the vibration devices 2031-2034 vibrate at low frequency, by virtue of the devices' 2031-2034 mechanical response, as described in further detail hereinabove.

Each of the connections between the signal receiver 2010 and the signal generator 2020, and between the signal generator 2020 and each of the vibration devices 2031-2034, may be wireless or rather wired, as described in further detail hereinabove.

In some embodiments, for the connections which are wireless, the signal generator 200 includes a mechanism for optional switching between different RF frequencies.

Optionally, each of the vibration devices 2031-2034 is designed to impart low frequency vibration to the specific body area, on which the vibration device is deployed, as described in further detail hereinabove.

Optionally, at least one of the vibration devices has a characteristic optimized for the specific body area on which the vibration device is deployed. For example, the vibration device may vibrate in a direction optimal for the specific body area, as described in further detail hereinabove.

The headphone/speaker units 2040 are designed to impart normal, full bandwidth sound to one or more standard headphones and/or speakers.

In some embodiments, the one or more waist vibration devices 2033 are designed for attachment to an article of clothing wear on the waist area, such as a belt, trousers, a skirt, and so on.

In some embodiments, the waist vibration devices 2033 are designed for attachment to the waist area by a strap, similar to a heart beat monitor. In some embodiments, the strap may be a rubber or silicone strap, say a strap similar to a pulse rate monitor strap. In some embodiments, the waist vibration devices 2033 are designed to be built into a belt.

In some embodiments, vibrations imparted by the waist vibration devices 2033, are directional vibrations in a direction optimized for the area of the waist, say in a direction transverse to the surface of the body or skin, of the wearer, as describe in further detail hereinbelow.

In some embodiments, the chest vibration devices 2034 are designed for attachment to an article of clothing wear on the chest area, such as a shirt, a jacket, an undershirt, a bra, a strap, and so on.

The chest vibration devices 2034 may prove advantageous for high audio volume environment such as a live stage. When used in high noise surroundings such as live performances, the chest vibration devices 2034, and optionally also the waist vibration devices 2033, may be attached more tightly to a wear's body. The chest vibration devices 2034 may be attached to the wear's body, using one or more of a strap, a belt, an adhesive strap, a semi-rigid adhesive strap, a loop and hook attachment such as a Velcro™ strap, etc., as known in the art.

In some embodiments, the media signal receiver 2010 and the signal generator 2020 are packaged together in one unit 2070.

In some embodiments, the media signal receiver 2010, the signal generator 2020, and one or more of the waist vibration devices 2033 are packaged together in one unit 2080.

In some embodiments, the media signal receiver 2010, the signal generator 2020, and one of the chest vibration devices 2034 are packaged together in a single unit (not shown).

In some embodiments, the media signal receiver 2010, the signal generator 2020, and one of the foot vibration devices 2031, 2032, are packaged together in a single unit (not shown). Optionally, the one unit is a shoe unit, which is optionally built into a shoe, rather than attached onto the shoe.

Each of the parts of the apparatus 20000 may require a source of electrical energy.

The sources of electrical energy may be a battery which may be either regular or rechargeable. Additional methods of providing electrical energy to parts of the apparatus 20000 include, but are not limited to: using a person's movements to generate electrical energy, using induction coils that receive energy radiated from an energy transmitter, or using rechargeable batteries, say with large capacitors, etc.

Additional methods of providing energy to the parts of the apparatus 20000 may include storing and releasing mechanical energy, such as winding and releasing a mechanical spring (not shown).

According to some exemplary embodiments of the present invention, vibrations applied by different ones of the vibration devices 2031-2034, on each specific body area, may have area-specific characteristics.

The area specific characteristics may include, but are not limited to: a specific direction (say in a specifically selected angle to the body surface), a vibration phase which changes among different body areas, an area specific waveform, etc., as described in further detail hereinabove.

For example, transverse vibrations are typically felt in fleshy locations as less localized than perpendicular vibrations, and aid the brain in producing a whole body vibration sensation.

Perpendicular vibrations are typically felt in fleshy locations as more localized, and not spread out.

In some body areas, typically near bone, perpendicular vibrations are felt as being less localized and more spread out.

Consequently, each of the vibration devices of the present invention, may be designed for applying vibrations in a direction transverse to the wearer's body surface, or skin, or at a substantially oblique angle across the wearer's body surface or skin, according to the vibration device's intended body area of deployment.

That is to say that the particular design and arrangement of the vibration devices may serve to optimize the vibrations for the specific body area, as described in further detail hereinabove.

With conventional methods, in order to help the brain get a whole-body sensation, vibrations have to be imparted to a body area as large as possible.

By contrast, with an exemplary embodiment of the present embodiments, there is imparted a specific vibration to each respective area among carefully selected areas of a user's body. The vibration may have position-specific characteristics such as a specific direction (say in a specifically selected angle to the body surface), a position specific waveform, etc., as described in further detail hereinabove. Consequently, a small number of vibration devices may generate a whole-body sensation.

For example, the foot vibration devices 2031, 2032 of apparatus 20000, may generate a vibration in a direction perpendicular to the bone. In boney areas, perpendicular vibrations are felt as being less localized and more spread out, as described in further detail hereinabove.

Consequently, the vibrations imparted on the foot, say on the foot's sole, may help simulate a real life effect of a vibrating environment on the whole foot.

As the feet supply much of the vibration sensation for the brain, vibrations imparted on the feet together with vibrations applied on the waist, may provide a substantially sufficient vibration sensation for the brain to provide a whole-body sensation.

In some embodiments, the signal generator 2020 tailors the low frequency signals with a waveform shaped for inducement of vibrations that emulate movement like sensations, such as the sensations felt in an open air theater, a closed dance club, a car having powerful bass speakers, and so on.

For example, the signal generator 2020 may tailor the law frequency signal, so as to apply a vibration of an asymmetric saw tooth waveform, on the body area on which the vibration device is deployed. Consequently, a directional sensation is felt by the brain of the user.

In another example, the signal generator 2020 tailors the law frequency signal, so as to apply a vibration of a waveform alternating between two or more asymmetric saw tooth (or other) patterns on the body area on which the vibration device is deployed. Consequently, a directionally changing sensation is felt by the brain of the user.

In some embodiments, the signal generator 2020 tailors a different amplification for signals sent to vibration devices deployed on different body areas, in order to compensate for different sensitivities at each of the body areas.

In some embodiments, the signal generator 2020 produces a different signal or different amplitude of a similarly shaped signal to each of the body areas.

Optionally, the signal generator 2020 introduces a delay or a phase shift between signals sent to different body areas, based, at least in part, on a distance between the different vibration devices on a wearer's body.

In some embodiments, the delay is based on a speed of sound in a body, in bones, as apposed to flesh.

In some embodiments, the delay is based on a difference between a speed of sound in air and the speed of sound in a solid medium, such as a wood floor or a concrete floor.

In some embodiments, the signal generator 2020 tailors a different signal, for each of the body areas, based, at least in part, on which body area the signal is destined for.

In some embodiments, for a whole body sound sensation, it may be enough to produce body area specific amplitudes for different signals of a similar waveform. The different amplitudes may balance between the body areas, such that no body part produces sensations overpowering sensations produced by another body part.

Consequently, the sensations produced by the body parts may be well balanced.

The signal generator 2020 may also tailor each of the signals with a frequency range optimal for the specific body area that the signal is destined for.

By way of a non-limiting example, the sternum reacts better to 40 Hz vibrations than the feet, when receiving the same power. In order for the sound experience to be balanced, the sternum may receive a less amplified 40 Hz signal than the feet.

Vibration devices constructed according to some embodiments of the present invention, may optionally be used for indication and/or tactile feedback purposes, such as enabling deaf users to feel warning sounds and/or a vehicle reverse warning, and such as tactile feedback for controlling equipment, based on amplitude or frequency of vibration sensations.

The present invention, in some embodiments thereof, may optionally simulate an acoustic or an environment characterized by certain vibrations, for purposes of research on human responses, for medical purposes, and so on. By way of a non-limiting example, specifically the brown, yellow, and/or green frequencies may be amplified and not attenuated.

The present invention, in some embodiments thereof, may optionally simulate an acoustic environment such as a cradle, a car, an airplane, and so on.

The present invention, in some embodiments thereof, may optionally quiet down an acoustic environment, by picking up environmental sounds and cancelling the vibration sensation produced by the environmental sounds.

The present invention, in some embodiments thereof, may optionally produce vibration sensation in a vacuum or near vacuum environment, or under water, or environments where sound is hard to produce or does not travel well. The source of the sound is optionally provided by wire or wirelessly, and the vibrations produced are induced directly to the user's body, and/or clothes, and/or attached accessories, without relying on air for sound and/or vibration conductance.

Vibration devices constructed according to some embodiments of the present invention, may optionally be used for medical purposes, such as psycho-acoustic therapy, tissue and bone therapy using sound waves and/or low frequency vibrations, physiotherapy, treatment of vertigo and/or balance, and treatment of digestion problems.

It is expected that during the life of this patent many relevant devices and systems will be developed and the scope of the terms herein, particularly of the terms "Digital Signal Processing (DSP)", "Chip", "Electric Circuit", "Amplifier", "Filter", "Magnet", "LFE (Low Frequency Effects)", "Channel", "Transmitter" and "Receiver", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A vibration device for creating physical vibrations in response to supplying varying alternating current signals comprising: at least one partially elastic closed frame; a coil affixed to a first edge of said closed frame; and an array affixed to a second edge of said closed frame opposite to said first edge; said array comprising one or more magnets, said closed frame being configured to restrain said array and coil into an optimal relative position, preventing said magnets from moving closer to and away from said coil to limit movement of at least one of said array and coil to a predefined path tangential to the axis of said coil, the movement being resultant upon an alternating electric current being applied to said coil, wherein said vibration device is wearable.

2. The vibration device of claim 1, wherein the alternating magnetic field of the coil is oriented substantially perpendicularly to the array of the magnets and substantially opposite a midway point between the magnets.

3. The vibration device of claim 1, wherein said first edge and second edge are parallel to each other.

4. The vibration device of claim 1, wherein said closed frame comprises four edges.

5. The vibration device of claim 1, wherein said closed frame comprises four edges, and wherein said first edge and second edge have different lengths.

6. The vibration device of claim 1, wherein at least one of said magnets of said array is a coil.

7. The vibration device of claim 1 characterized by a natural frequency optimal for harmonization with an intended excitation signal.

8. The vibration device of claim 1, further comprising a case housing said frame, coil and array, wherein one of said array and coil is affixed to a fastener protruding from said case and connecting to an external element, for imparting a movement to said external element.

9. The vibration device of claim 1, further comprising a signal receiver, connected to said coil, configured to receive a signal and apply an alternating electric current based on said received signal to said coil, thereby applying an excitation signal on the vibration device.

10. The vibration device of claim 1, further comprising a USB Socket.

11. The vibration device of claim 1, wherein said close shaped frame comprises a material selected from the group consisting of metallic materials, rubber, silicone and nonmetallic materials.

12. The vibration device of claim 1, wherein said close shaped frame is selected from the group comprising compound polygons and polygons.

13. The vibration device of claim 1, wherein the partially elastic close shaped frame is designed with asymmetry.

14. The vibration device of claim 9, further comprising a user interface operable by a user for modifying amplitude of said alternating electric current applied to said coil by said signal receiver.

15. The vibration device of claim 9, further comprising a signal processor, in communication with said signal receiver, configured to tailor the received signal for a specific body area.

16. The vibration device of claim 13, wherein said asymmetry is in at least one of the group comprising:
   (i) a width of said partially elastic close shaped frame;
   (ii) a thickness of said partially elastic close shaped frame;
   (iii) material composition of said partially elastic close shaped frame;
   (iv) density of material of said partially elastic close shaped frame;

(v) shape of said partially elastic close shaped frame, and
(vi) at least one element connected to said partially elastic close shaped frame.

17. A vibration device for creating physical vibrations in response to supplying varying alternating current signals comprising:
a case;
an elastic element connected to said case;
a plurality of magnets forming a mass held together by virtue of attraction among said magnets, and connected to said elastic element; a plurality of coils, each of said coils being affixed to a side of said case, said elastic element being configured to restrain said mass into a position in which an axis of each of said coils is directed to a middle of a respective array comprising at least one of said magnets, to limit movement of said mass to a predefined path, the movement being resultant upon an alternating electric current being applied to at least one of said coils, and to transmit said movement between said mass and said case.

18. The vibration device of claim 17, wherein said mass is mounted on said elastic element.

* * * * *